United States Patent
Bartha et al.

(10) Patent No.: US 11,781,059 B2
(45) Date of Patent: Oct. 10, 2023

(54) POLYMER-SURFACTANT COMPOSITIONS FOR ENHANCED OIL RECOVERY PROCESS

(71) Applicant: MOL MAGYAR OLAJ- ÉS GÁZIPARI NYILVÁNOSAN MÜKÖDÖ RÉSZVÉNYTÁRSASÁG, Budapest (HU)

(72) Inventors: László Bartha, Veszprém (HU); Sándor Puskás, Szeged (HU); József Dudás, Veszprém (HU); Roland Nagy, Sóly (HU); Árpád Vágó, Kiskunhalas (HU); István János Lakatos, Miskolc (HU); Mária Törö, Budapest (HU)

(73) Assignee: MOL Magyar Olaj és Gázipari Nyilvánosan MüködöRészvénytársaág, Budapest (HU)

( * ) Notice: Subject to any disclaimer, the term of this patent is extended or adjusted under 35 U.S.C. 154(b) by 305 days.

(21) Appl. No.: 17/042,393

(22) PCT Filed: Mar. 28, 2019

(86) PCT No.: PCT/HU2019/050013
§ 371 (c)(1),
(2) Date: Sep. 28, 2020

(87) PCT Pub. No.: WO2019/186218
PCT Pub. Date: Oct. 3, 2019

(65) Prior Publication Data
US 2021/0371725 A1     Dec. 2, 2021

(30) Foreign Application Priority Data

Mar. 29, 2018 (HU) .................................... P1800111
Mar. 27, 2019 (HU) .................................... P1900096

(51) Int. Cl.
C09K 8/584 (2006.01)
C09K 8/588 (2006.01)
E21B 43/16 (2006.01)

(52) U.S. Cl.
CPC .............. *C09K 8/584* (2013.01); *C09K 8/588* (2013.01); *E21B 43/16* (2013.01)

(58) Field of Classification Search
None
See application file for complete search history.

(56) References Cited

U.S. PATENT DOCUMENTS 4,638,865 A * 1/1987 Ball ...................... C09K 8/588
507/225
5,110,487 A    5/1992 Current
(Continued)

FOREIGN PATENT DOCUMENTS

WO    2011/106287 A1    9/2011

OTHER PUBLICATIONS

Negin et al.: "Most common surfactants employed in chemical enhanced oil recovery", Petroleum, 2017, vol. 3, No. 2, pp. 197-211.
(Continued)

*Primary Examiner* — John J Figueroa
(74) *Attorney, Agent, or Firm* — Jason D. Voight

(57) ABSTRACT

The present invention relates to a composition for an enhanced oil recovery process, said composition comprising
(a) one or more anionic cocogem surfactants;
b) one or more surfactants based on nonionic vegetable fatty acids (or their synthetic analogues);
c) optionally one or more, preferably commercially available, co-surfactants;
d) optionally one or more agents with phase transfer property, preferably an alcohol; and
e) polyacrylamide as a flow modifier.

20 Claims, 2 Drawing Sheets

(56) References Cited

U.S. PATENT DOCUMENTS

| | | | | |
|---|---|---|---|---|
| 5,120,708 | A * | 6/1992 | Melear | C09K 8/22 |
| | | | | 508/579 |
| 6,022,834 | A | 2/2000 | Hsu et al. | |
| 7,556,098 | B2 | 7/2009 | Berger et al. | |
| 7,998,911 | B1 | 8/2011 | Berger et al. | |
| 2005/0197275 | A1 | 9/2005 | Hsu et al. | |
| 2006/0211596 | A1 * | 9/2006 | Hsu | C11D 3/3723 |
| | | | | 510/499 |
| 2009/0107681 | A1 * | 4/2009 | Hough | C09K 8/44 |
| | | | | 507/231 |
| 2010/0029880 | A1 | 2/2010 | Zhang et al. | |
| 2013/0203636 | A1 | 8/2013 | Xiang et al. | |
| 2014/0096967 | A1 | 4/2014 | Sharma et al. | |
| 2015/0011453 | A1 | 1/2015 | Bennett et al. | |
| 2016/0122621 | A1 * | 5/2016 | Li | C09K 8/584 |
| | | | | 507/240 |
| 2016/0200963 | A1 | 7/2016 | Reed et al. | |
| 2021/0122968 | A1 | 4/2021 | Dudás et al. | |

OTHER PUBLICATIONS

Nagy et al.: "Harmadlagos köolaj-kitermelesre alkalmas tenzidek kiválasztasi módszerei" (Methods of Selection of Surfactants for Tertiary Oil Recovery), Müszaki Szemle (Technical Review), 2014, vol. 63, pp. 26-33.

* cited by examiner

POLYMER-SURFACTANT COMPOSITIONS FOR ENHANCED OIL RECOVERY PROCESS

This is the national stage of International Application PCT/HU2019/050013, filed Mar. 28, 2019.

The present invention relates to a composition for an enhanced oil recovery process, said composition comprising:
(a) one or more anionic cocogem surfactants;
b) one or more nonionic surfactants based on plant fatty acids (or their synthetic analogues);
c) optionally, one or more, preferably commercially available, co-surfactants, such as, in particular, a reaction product of fatty acids or vegetable oils having 16 to 20 carbon atoms, e.g. oleic acid or mixed rape and sunflower fatty acid and (200-600 average molecular weight) polyethylene glycol, preferably an Elain-PEG-300 ester;
d) optionally one or more phase transfer agents, preferably an alcohol;
e) polyacrylamide as a flow modifier.

DESCRIPTION OF THE STATE OF THE ART

Perspective versions of chemical, fluid-infiltration based enhanced oil recovery processes (hereinafter referred to as EOR) are characterized in that, following the use of conventional processes, the residual oil in the reservoir layer is pressed from the reservoir rock layer to the oil production wells by injecting aqueous surfactant solutions that reduce the oil-to-water interfacial tension. During recovery, aqueous solutions (polymeric surfactant solutions) containing the surfactants and flow-regulating polymer release and dissolve the residual crude oil from the surface and pores of the reservoir rock, which is delivered to the surface through the production wells as oil (from oil base) or emulsion.

One of the essential conditions for the success of the processes is that the polymer-surfactant solutions have a high emulsifier and oil displacement effect from the surface of the reservoir rock pores. Another important condition for the excellent performance of the methods is that the polymer-surfactant solution should have a relatively high viscosity, viscoelastic rheological characteristic, i.e. from the rheology point of view it needs to be shear-thinning type. A third important condition for the preparation of high efficiency polymer-surfactant solutions is the high biological, chemical and thermal stability of the displacement solution. Of these, due to the deeper oil drilling and, consequently, higher temperatures up to 100° C., the role of high temperature chemical and thermal stability of displacement fluids is becoming increasingly important.

Due to the continuous tightening of quality requirements, many new surfactants and compositions have been developed over the past two decades as a further development of the polymer-surfactant compositions and individual components of polymer-surfactant processes. Their main development goals are to further increase efficiency, temperature, and thermal stability, and reduce specific cost of use. In the absence of sufficiently high thermal stability compositions, no economical solution has yet been described for enhanced oil recovery from reservoirs above 100° C., which are in deeper layers than the present reservoirs. Majority of the surfactant compositions that have been developed for polymer-surfactant processes have been characterized by the use of at least one nonionic, one or more ionic surfactant and a flow modifying polymer, as well as even a combination of auxiliary agents such as antioxidant, oxygen trapping and solvent compounds.

In the newly developed compositions for enhanced oil recovery processes based on fluid infiltration, the following anionic or cationic surfactants are generally used. Among the long-used alkyl-aryl-sulphonates and alkylbenzene-sulphonates, the most preferred types are those containing linear, mostly saturated alkyl groups having 10 to 14 carbon atoms with which at low critical concentration for micelle forming (hereinafter referred to as CMC, Critical Micelle-forming Concentration; typically 1-150 g/l) an IFT of $110^{-1}$-$10^{-2}$ mN/m oil/water interfacial tension (hereinafter referred to as IFT, Interfacial Tension) can be achieved. An overview of the most common surfactants used in chemical EOR technology is given by C. Negin et al., "Most common surfactants employed in chemical enhanced oil recovery". (Petroleum (2017) vol. 3, no. 2, pp. 197-211). N-ethoxysulphonates, alpha-olefin sulphonates, and alkyl polyalkoxyalkyl sulphonates are also widely used, such as e.g. disclosed in U.S. Pat. No. 5,110,487 patent document.

In the composition of the new surfactant compositions, anionic gemini surfactants have appeared, which are capable of greatly reducing the IFT up to $10^{-2}$-$10^{-3}$ mN/m, even when they are used at low concentrations (typically 0.5-10 g/l). Their thermal stability is characterized by the fact that their previous versions have proved to be stable even when applied at a layer temperature of 75-100° C.

In practice, ionic surfactants are generally used in combination with a nonionic surfactant and other known additives with supplementary effect, i.e., they are used in compositions. For example, according to U.S. Patent No. 20090107681, with the use of a composition comprising a conventional alkylphenol ethoxylate type, non-ionic emulsifier, the stability of the flow modifying polyacrylates to salts in aqueous solutions was enhanced.

According to U.S. Pat. No. 5,110,487, a composition comprising alkylphenol-polyol-ethers and alpha-olefin-sulphonates has been used to reduce the viscosity of the oil/water emulsions and thereby increase the mobility of the multiphase fluid formed during the displacement process. The disadvantage of these end products is that in only a few of the many required properties are the compliance limits achieved, which is only a partial solution and in itself is not sufficient for the economy of the process.

To increase the effectiveness of surfactant compositions, a pH-increasing component is often mixed with the aqueous surfactant displacement solution. For example, according to U.S. Pat. No. 6,022,834, to enhance the recovery of crude oils containing acidic functional groups of natural origin, 0.6 to 1.5% by weight of NaOH was admixed to the displacement solution containing sodium salts of benzene-sulphonates, alkyl-benzene-ethoxylates and viscosity polyacrylate polymer. With this alkaline excess, the pH of the surfactant solution was raised to above 10, resulting in a highly alkaline solution reacting with the natural carboxylic acids in the oil during the infiltration, to form surfactant organic sodium salts, which were able to produce an ultra-low interfacial tension displacement fluid. A disadvantage of their process is that the use of a strong inorganic base may result in severe structural destruction of the rock material in the reservoir layer, which would prevent the extraction of residual oil.

According to U.S. Pat. Nos. 7,556,098 and 7,998,911, instead of the commonly used nonionic surfactants, using a combination of lower thermal stability, amphoteric, vegetable fatty acid-betaine type of surfactants and an alkylbenzene-sulphonate-sodium salt, an ultra low oil/layer water interfacial tension, below the value $10^{-2}$-$10^{-3}$ mN/m was achieved. A low concentration and high salt content solution of the surfactant composition according to the cited patent has been found to be suitable for the displacement of crude oil from small pore size reservoir layers. The disadvantage of such surfactant compositions is that they cannot be used in heterogeneous pore sizes and in high temperature storage layers above 100° C.

Typically, as nonionic surfactants, specific compounds that have been known for a long time in the detergent or cosmetic industry or have been used in the manufacture of lubricants, or improved versions thereof are applied. Particularly frequently used are the individual molecular structure alkylphenol-ethers, the fatty alcohol polyalkylene-glycol ethers and the fatty acid polyol esters. Their use is limited by their decomposition at temperatures above 60° C. to 90° C. and, consequently, the decrease of their solubility in water.

US Patent document 20140096967 describes a composition and process for recovering residual hydrocarbons in storage layers. In the described solution the reduction of the interfacial tension (IFP) and the increase of the hydrocarbon production efficiency are achieved by the use of anionic gemini surfactants, optionally in combination with other known surfactants or polymers. This solution differs in several aspects from the present invention. In the referenced document gemini surfactants are mentioned, in which the surfactant moieties are covalently bonded to the head group, while in the cocogem surfactants of the present invention, the two or more ionic monomeric surfactants are linked by a non-covalent, but rather ionic "spacer" moiety (i.e., the linker contains counter-ionic parts bearing charges opposite to the head group of the monomeric surfactants). Furthermore, the cited document proposes to increase the efficiency of the selected enhanced hydrocarbon recovery method with a composition comprising an anionic type of surfactant selected only according to properties such as salt tolerance, surface activity and viscosity under certain conditions, and any other known surfactant and polymer. Practical experience has shown that successful polymer surfactant compositions have to meet the requirements of many other properties, such as sufficiently high emulsifying capacity, a significant oil displacement effect on real rock cores, or solubility in layer water and hydrocarbons. In contrast, the composition of the present invention comprises an anionic cocogem surfactant, a chemically new non-ionic surfactant mixture modified by an increased weight ratio of its polar groups, and a viscosity enhancing polymer, in order to increase the efficiency of hydrocarbon production, wherein the resulting synergistic interactions are advantageously utilized. Due to the positive and negative interactions in this multicomponent composition, we had to use a wider range of properties that could be evaluated for usability when optimizing the composition. Another disadvantage of the solution of the document cited is that there is no measured evidence of compatibility of the anionic gemini composition with other types of surfactants. Another important difference between the referenced document and the present invention is that while the referenced document refers only to the synergistic effect between the anionic gemini surfactant used there and a non-gemini surfactant, an important feature of the present invention is the presence of a synergistic effect between cocogem surfactant and the employed a polymer and a non-ionic surfactant; said feature is not mentioned in the document cited.

According to WO2008052015 International Patent Publication document, copolymers containing water-soluble, dispersing and emulsifying, mainly polyacrylic acid-based reaction products have been used for the infiltration EOR process. Polymer structures containing hydrophilic and hydrophobic groups in various molar ratios were produced during the functionalization of the copolymer. Thus, a molecular structure containing functional groups capable of forming anionic, cationic, nonionic or amphoteric ion pairs has been created. The multifunctional copolymer thus produced, in addition to its viscosity modifier, i.e. mobility control function, has proved to be suitable for mobilizing residual oil in the storage layer and thus for increasing the recovery yield efficiency. However, the composition comprising the described copolymer is fundamentally different from both the composition and the concept of the present invention. A disadvantage of the composition according to the cited document is that it can only reduce the oil-to-water interface tension between IFT=0.1-15 mN/m, but according to extensive practical experience, a value of at least below IFT=0.01 mN/m would be needed to achieve an adequate recovery yield efficiency.

Roland Nagy et al. ["Harmadlagos kőolaj-kitermelésre alkalmas tenzidek kiválasztási módszerei" (Methods of Selection of Surfactants for Tertiary Oil Recovery), Műszaki Szemle (Technical Review), 63 (2014) 26-33] describe the use of a preferred combination of methods for EOR impact assessment. However, the cited document does not disclose a surfactant-polymer composition according to the present invention comprising anionic cocogem surfactants, and accordingly, there is no indication of synergistic interaction between the anionic cocogem surfactant and the polymer, either.

In U.S. Patent No. 20160200963 aqueous polymer dispersion type composition was prepared by a thermally initiated radical copolymerization of mixtures consisting of 20-30 mol % of N,N-dialkyl-N,N-diallyl ammonium salt, 20-40 mol % of anionic monomer and 35-40 mol % of nonionic monomer and other similar monomers, which was applied at a concentration of 0.01 to 5.0% by weight in layer water or synthetic seawater at a temperature of 120-190° C. during the infiltration tertiary extraction process. The polymer composition capable of both dispersing the crude oil and improving the flow properties was supplemented, if necessary, with other known additives of various functions, and its stability against thermal and oxidative degradation proved to be satisfactory. Because of the marked difference in composition, the composition disclosed in the cited document is also fundamentally different from the present invention. Furthermore, as a disadvantage of the solution, it is noted that the proposed solution is too expensive due to the combined concentration of the multifunctional polymer composition and the recommended additional additives. Additionally, no beneficial interaction between the components of the composition was shown to increase efficacy. A further disadvantage is that, when an aqueous polymer dispersion is used, the dispersed state particles of the polymer can filter out in the pores of the reservoir rock, thereby increasing the resistance of the reservoir rock to the liquid flow and thereby the pumping energy demand for the recovery.

THE PROBLEM TO BE SOLVED BY THE PRESENT INVENTION

The enhanced oil recovery process, also referred to as the tertiary oil recovery process, requires the use of chemicals, specifically polymer-surfactant solutions that meet some technical conditions:
1. the polymer-surfactant compositions must have a high emulsifiers and oil displacement effect from the surface of the rock pores; to achieve this, it is advantageous if the micelles formed are of relatively larger size.
2. The polymer-surfactant compositions must have a relatively high viscosity, unexpectedly viscoelastic rheology, i.e., they must be of rheologically shear-thinning character;
3. the high physical and chemical stability of the displacement solution (in particular oil, layer water, gas resistance, salt tolerance);
4. it is necessary to provide thermal stability of polymer-surfactant compositions: no economical solution has yet been described for the enhanced oil recovery from reservoirs above 100° C. in deeper layers than presently, in the absence of sufficiently high thermal stability compositions;
5. for environmental and technological reasons, the amount of surfactants used in reservoirs should be reduced (in the case of too much surfactants used, the separability from the oil decreases, becomes difficult or economically impossible); to this end, the critical concentration for micelle formation should be reduced by a magnitude (this is necessary to reduce the amount);
6. in order to be able to deform the water-oil interface using low concentrations to facilitate penetration of the pores of the reservoir rock, the w/o interfacial tension (IFT) must be reduced to the about $10^{-2}$-$10^{-3}$ mN/m target;
7. in order to reduce the adsorbed amount of material at the surface of the reservoir rock and to have a high desorption potential (to obtain a so-called reversible surfactant), appropriate control of adsorption/desorption properties is required.
8. Further criteria for compliance is stability at the temperature of the storage layer, but at least at 100° C. for at least one year.

THE DISCOVERY ACCORDING TO THE PRESENT INVENTION

To achieve the above-mentioned goals, we have carried out systematic experimental work, which has resulted in our invention. Surprisingly, in our experimental work it has been found that by using a combination of a special surfactant composition and a water-soluble polymer, preferably a polyacrylamide polymer, an outstanding excess oil displacement (25±5% by volume) can be achieved, and the resulting polymer-surfactant composition also has unexpected thermal stability.

This unexpected excess oil displacement can be explained by the synergistic interaction of the surfactant composition used and the water-soluble polyacrylamide which results in extra-large mixed micelles (i.e. two or more surfactants).

Figure 2:
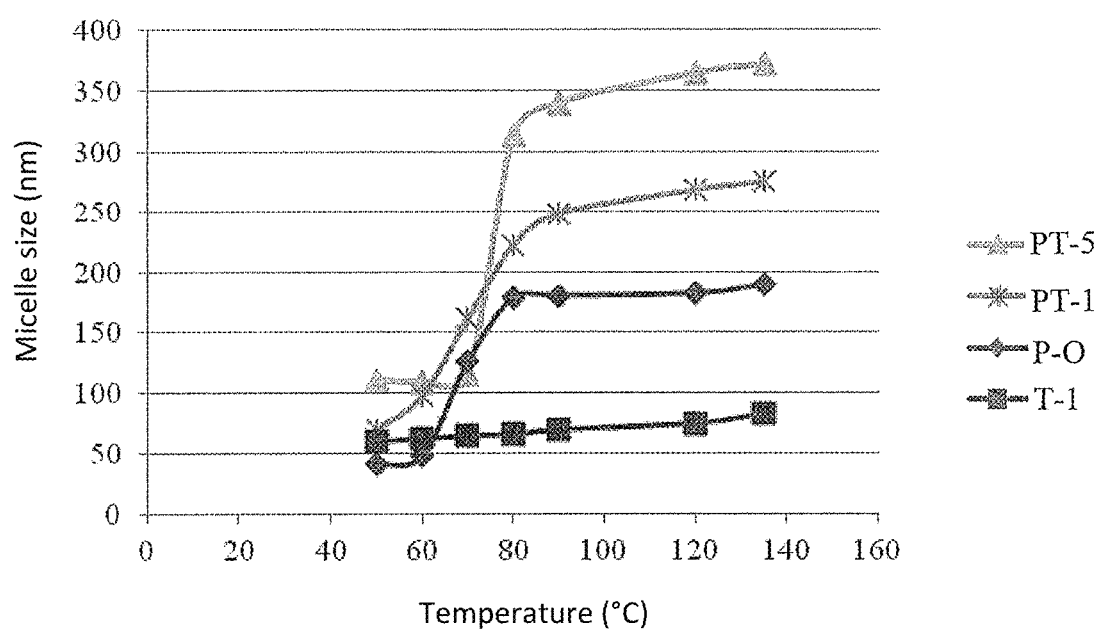
FIG. 2: Change in micelle size as a function of temperature increase in aqueous solutions containing only polymer, only surfactant and polymer-surfactant composition according to the invention. In the figure, P-0 illustrates the micelle size change of the clear polymer solution, of PT-1 and PT-5 which are the polymer-surfactant compositions of the present invention, and of T-1 which is the polymer-free surfactant solution.

The synergism is supported by FIG. 2, where it can be seen that the micelle sizes have been surprisingly increased for the polymer surfactant composition of the present invention as compared to the starting components. One skilled in the art would expect, e.g. if at 80° C. for one component the average size is 60 nm (see T1, pure surfactant mixture), it is 180 nm for the other (see P-0, pure polymer), then in case of their mixture, an average value between said 60 nm an 180 nm values is expectable. In contrast, we have experienced micelle size growth due to the formation of mixed micelles. Further, one skilled in the art would expect the micelle size to decrease as the temperature increases, resulting in reduced thermal stability; in the present case, the reverse of the phenomenon was observed for mixed micelles, i.e. the micelle size increased with the increase in temperature, and due to the increased micelle size, the oil displacement efficiency also increased (see Table 7).

Furthermore, the exceptional thermal stability of the polymer-surfactant combination according to the invention can be attributed to the generated extra-large, chemically also stable, high-solubility micelles also in water at higher temperatures said micelles having an average particle size of up to 1000 nm.

The synergy causing the high efficiency and thermal stability, which was detectable in the presence of the combination of both the polymer and the surfactant used, was not expected at all due to the composition of the material and overall experience.

We also highlight the excellent viscoelastic properties of the composition, which is advantageous because such an infiltration agent "pulls" the oil droplets out of the capillaries (see https://link.springer.com/article/10.1007/s13202-013-0087-5).

The present invention is therefore based on the discovery that the attainment of the stated technical objectives can be achieved by a composition comprising one or more cocogem surfactants, one or more nonionic oxidized vegetable fatty acids (or synthetic analogues thereof) based surfactants, optionally one or more commercially available co-surfactants, such as, in particular, the reaction product of a fatty acid having 16 to 20 carbon atoms, preferably oleic acid, or mixed rape and sunflower seed fatty acid, or various vegetable oils, and (average molecular weight 200-600) polyethylene glycol, preferably an oleic acid-PEG-300 ester (elain PEG-300; elain is the commercial name of oleic acid), one or more phase transfer agents, preferably an alcohol, and a water-soluble polymer, preferably polyacrylamide, as a flow modifier.

BRIEF DESCRIPTION OF THE INVENTION

1. A highly stable micelle-structured polymer-surfactant composition for an enhanced oil extraction process, said composition comprises the following ingredients:
   a) one or more anionic cocogem surfactants selected from the following compounds of formula (I):

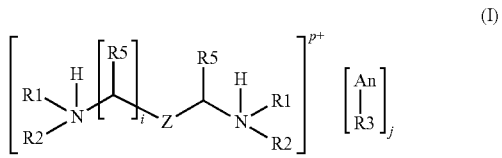

(I)

wherein in the formula
each R1 and R2 is independently selected from hydrogen; or straight or branched chain alkyl having 1 to 18 carbon atoms, optionally substituted with hydroxy;
each R3 is independently selected from hydrogen; a straight or branched chain alkyl or alkenyl group having from 1 to 25 carbon atoms, optionally containing an inter-chain amido group; an aromatic group optionally substituted with a straight or branched chain alkyl having 1 to 25, preferably 5 to 20, more preferably 5 to 15 carbon atoms, preferably selected from the group consisting of phenyl and diphenyl-ether; or a straight or branched chain alkenyl, alkadienyl or alkatrienyl group having 10 to 20 carbon atoms;
Z is a straight or branched chain alkylene group having 1 to 18 carbon atoms, optionally substituted with one or two alkyl having 1 to 6 carbon atoms or preferably with cycloalkyl having 3 to 6 carbon atoms, which alkylene group optionally contains $(EO)_n$ and/or $(PO)_m$ groups, where EO is ethylene oxide, i.e. —$CH_2CH_2O$—, and PO is propylene oxide, i.e. —$CH(CH_3)CH_2O$—, wherein n and m are independently integers from 0 to 30 and n+m is an integer from 1 to 30; and/or $[NH(R4)]^+$ quaternary ammonium, wherein R4 is hydrogen, alkyl having 1 to 6 carbon atoms, preferably methyl or ethyl;
R5 is hydrogen or alkyl having 1 to 6 carbon atoms, preferably methyl or ethyl;
An is selected from one or more groups selected from the group consisting of $SO_3^-$, $Cl^-$ or $CO_2^-$;
i is an integer of 0 or 1;
p is an integer of 2 or 3;
j is an integer of 2 or 3;
b) one or more nonionic surfactants which are a reaction product of a known nonionic surfactant constituent and one or more glyceride-type oxidized oils and/or one or more oxidized fatty acid-(C1-C5-alkyl)-esters, wherein the glyceride-type oxidized oil has an acid number of 0.7-3.0, preferably 1.1-2.0 mg KOH/g; the acid number of the oxidized fatty acid-(C1-C5)-alkyl ester is 0.3-0.9 mg KOH/g;
c) optionally one or more co-surfactants, in particular a reaction product of a fatty acid having 16 to 20 carbon atoms, preferably oleic acid or mixed rapeseed and sunflower fatty acids, or vegetable oils, and polyethylene glycol having an average molecular weight of 200 to 600, preferably an elain PEG-300 ester;
d) optionally one or more materials having phase transfer properties, preferably an alcohol, preferably a straight or branched chain alcohol having from 1 to 12 carbon atoms, preferably i-butanol or 2-butoxyethanol;
e) as a flow modifier polyacrylamide having an average molecular weight between 100,000 and 20,000,000 and a hydrodynamic molecular size between 100 and 50,000 nm, preferably between 100 and 10,000 nm, more preferably between 100 and 5000, more preferably between 100 and 1,000 nm.

The composition may optionally contain other known commercial additives such as a scavenger and/or scaling and/or complexing additives, such as e.g. EDTA, as well as the composition may also contain other stabilizing agent having the effect of increasing the solubility of the various additives in water or oil, such as e.g. a fatty alcohol-ether-sulphate or alkylphenol-ethoxylate.

2. The highly stable micelle-structured polymer surfactant composition according to Point 1, wherein in the formula (I) of the anionic cocogem surfactant each of R1 and R2 is independently selected from hydrogen; or straight or branched alkyl having 1 to 8 carbon atoms, or straight chain hydroxy substituted alkyl having 1 to 3 carbon atoms.

3. The highly stable micelle-structured surfactant composition according to Point 1 or 2, wherein in the formula (I) of the anionic cocogem surfactant each of R1 and R2 is hydrogen or alkyl having 1 to 4 carbon atoms, preferably methyl;
Z is a straight or branched chain alkylene having 1 to 6 carbon atoms, preferably 1 to 4 carbon atoms;
p and j are both 2 or 3;
R3 is phenyl substituted with straight or branched chain alkyl having 7 to 10 carbon atoms.

4. The highly stable micelle-structured surfactant composition according to any one of Points 1 to 3, wherein in the formula (I) of the anionic cocogem surfactant each of R1 and R2 is hydrogen;
i is 0;
R5 is methyl;
p and j are both 2;
R3 is selected from the group consisting of straight or branched chain alkyl or alkenyl having 1 to 18 carbon atoms; preferably a branched chain alkyl or alkenyl group having from 1 to 18 carbon atoms; more preferably a branched chain alkyl from 10 to 17, more preferably from 14 to 17 carbon atoms, or a secondary alkyl having from 14 to 17 carbon atoms, or alkenyl having from 14 to 17 carbon atoms;
Z is a straight or branched, preferably branched, alkylene group having 1 to 10, preferably 1 to 7 carbon atoms, containing $(PO)_m$ groups wherein PO is a propylene oxide group, i.e. —$CH(CH_3)CH_2O$—, and m is an integer from 1 to 5, preferably from 2 to 4, more preferably from 2 to 3.

5. The highly stable micelle-structured surfactant composition according to Point 1 or 2, wherein in the formula (I) of the anionic cocogem surfactant each of R1 and R2 is hydrogen or alkyl having 1 to 4 carbon atoms, preferably methyl;
Z is a straight or branched alkylene group having from 1 to 7, preferably from 1 to 4, more preferably from 2 to 4 or 3 carbon atoms;
p and j are both 2 or 3;
R3 is selected from the group consisting of straight or branched chain alkyl or alkenyl having 1 to 18 carbon atoms; preferably a branched chain alkyl or alkenyl group having from 1 to 18 carbon atoms; more preferably a branched chain alkyl group having from 10 to 17 carbon atoms; more preferably a secondary alkyl group having from 14 to 17 carbon atoms;
i is 1; and
R5 is hydrogen.

6. The highly stable micelle-structured polymer surfactant composition according to Point 1, wherein in the formula (I) of the anionic cocogem surfactant R1 and R2 is independently selected from hydrogen; methyl or straight-chain alkyl having 1 to 3 carbon atoms substituted with hydroxy.

7. The highly stable micelle-type polymer surfactant composition according to Point 1, wherein in the formula (I) of the anionic cocogem surfactant Z is a straight or branched chain alkylene having from 1 to 6, preferably from 1 to 4, more preferably from 2 to 4, or 3 carbon atoms;
p and j are both 2 or 3;
R3 is phenyl substituted with straight or branched chain alkyl having 7 to 10 carbon atoms.

8. The highly stable micelle-structured polymer surfactant composition according to Point 1, wherein in the formula (I) of the anionic cocogem surfactant R1 and R2 is hydrogen;
i is 0;
R5 is methyl;
p and j are both 2;
R3 is branched chain alkyl having 14 to 17 carbon atoms or secondary alkyl having 14 to 17 carbon atoms or alkenyl having 14 to 17 carbon atoms; and
Z is a branched alkylene group having 1 to 7 carbon atoms containing $(PO)_m$ groups and m is an integer of 2-3.

9. The highly stable micelle-structured polymer surfactant composition according to Point 1, wherein in the formula (I) of the anionic cocogem surfactant R1 and R2 are hydrogen or methyl;
Z is a straight or branched chain alkylene having from 1 to 4 carbon atoms, more preferably from 2 to 4 or 3 carbon atoms;
p and j are both 2 or 3;
R3 is secondary alkyl having 14 to 17 carbon atoms;
i is 1; and
R5 is hydrogen.

A preferred embodiment of the highly stable micelle-structured polymer surfactant composition according to any of Points 1 to 9 is wherein the anionic cocogem surfactant
i) is composed of a 2:1 or 3:1 salt of 4-($C_{10}$-$C_{13}$-sec-alkyl) benzenesulphonic acid, preferably 90% is $C_{12}$ alkyl, and a diamine or triamine, respectively, or
ii) is composed of 2:1 or 3:1 salt of ($C_{14}$-$C_{17}$-sec-alkyl)-sulphonic acid and a diamine or triamine, respectively, or
iii) is composed of a 2:1 or 3:1 salt of ($C_{14}$-$C_{16}$-alpha-olefin-sulphonic acid and a diamine or triamine, respectively, or
iv) is composed of a 2:1 or 3:1 salt of cis-9-octadecanoic acid and a diamine or triamine, respectively.

A further preferred embodiment of a highly stable micelle-structured polymer surfactant composition according to any one of Points 1 to 9, wherein the anionic cocogem surfactant is selected from the group consisting of the following materials or a combination of two or more of the following materials:
i) bis(4-(2-alkyl)benzene-sulphonate)-poly(propylene-glycol)-bis(2-ammonium-propyl)-ether salt (DBSJ) anionic gemini surfactant;
ii) 2-methylpentane-1,5-diammonium-bis(4-(sec-alkyl)benzene-sulphonate);
iii) 3,3'-imino-bis(N,N-dimethylpropylammonium)-tris(4-(sec-alkyl) benzene sulphonate);
iv) O,O'-bis(2-aminopropyl)-polypropylene glycol-bis($C_{14}$-$C_{17}$ sec-alkane sulphonate);
v) bis($C_{14}$-$C_{17}$ sec-alkyl)-sulphonate)poly(propylene-glycol)-bis(2-ammonium-propyl) ether salt;
vi) 2-methylpentane-1,5-diammonium-bis($C_{14}$-$C_{17}$ sec-alkyl-sulphonate);
vii) O,O'-bis(2-aminopropyl)-polypropylene-glycol-bis(alpha-olefin-sulphonate);
viii) O,O'-bis(2-aminopropyl)-polypropylene-glycol-bis(cis-9-octadecanoate);

10. Polymer-surfactant composition according to any one of Points 1 to 9, wherein the nonionic surfactant is a reaction product of the reaction of one or more oxidized vegetable oils, or a synthetic analogue thereof, and/or one or more oxidized vegetable fatty acid-(C1-C5)-alkyl-esters, preferably methyl-esters, or a synthetic analogue thereof, and a alkanolamine having 1 to 12 carbon atoms, preferably alkanolamine having 1 to 12 carbon atoms, more preferably ethanolamine, diethanolamine, triethanolamine or a combination thereof, most preferably diethanolamine.

11. The polymer-surfactant composition of Point 10, wherein the nonionic surfactant based on one or more vegetable oils or the synthetic analogues thereof and/or the vegetable fatty acid methyl ester or synthetic analogues thereof has the following composition:
at least 70% by weight of fatty acid monoester (3) and fatty acid amide (4);
up to 20% by weight of other reaction products;
up to 25% by weight, preferably up to 15% by weight of unreacted starting material and catalyst by-product and other by-products.

The nonionic surfactant of Point 11 may be further characterized by that the nonionic surfactant is based on oxidized vegetable oil or a synthetic analogue thereof, and comprises materials selected from the following components:

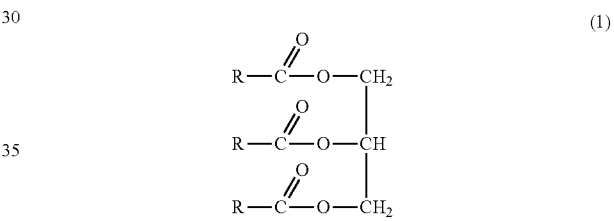 (1)

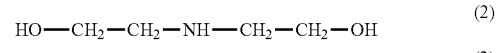 (2)

(3)

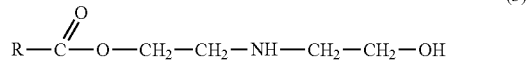

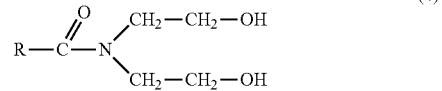 (4)

 (5)

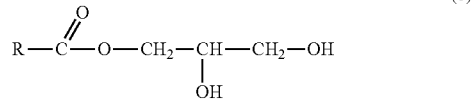 (6)

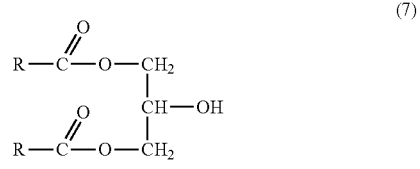 (7)

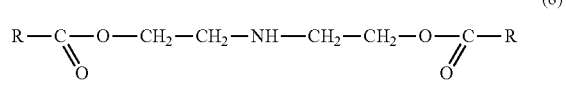 (8)

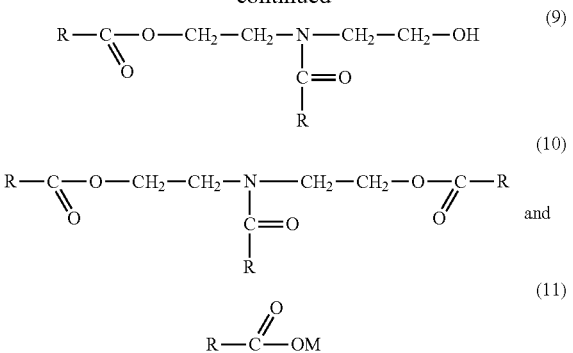

wherein R is a straight-chain saturated or unsaturated hydrocarbon having from 12 to 24 carbon atoms, preferably having 16 to 20 carbon atoms, wherein the unsaturated hydrocarbon is mono- or poly-unsaturated, and which contains 1 to 3 groups containing oxygen (carboxyl, hydroxyl, epoxy, hydroperoxy), preferably carboxyl, attached to the hydrocarbon chain as a consequence of the oxidative cleavage of a part of the original double bonds; and M is an alkali metal ion, preferably sodium or potassium.

In addition to the above, the nonionic surfactant of Point 11 may be further characterized by that the nonionic surfactant is based on oxidized vegetable fatty acid alkyl ester or a synthetic analogue thereof which comprises materials selected from the following components:

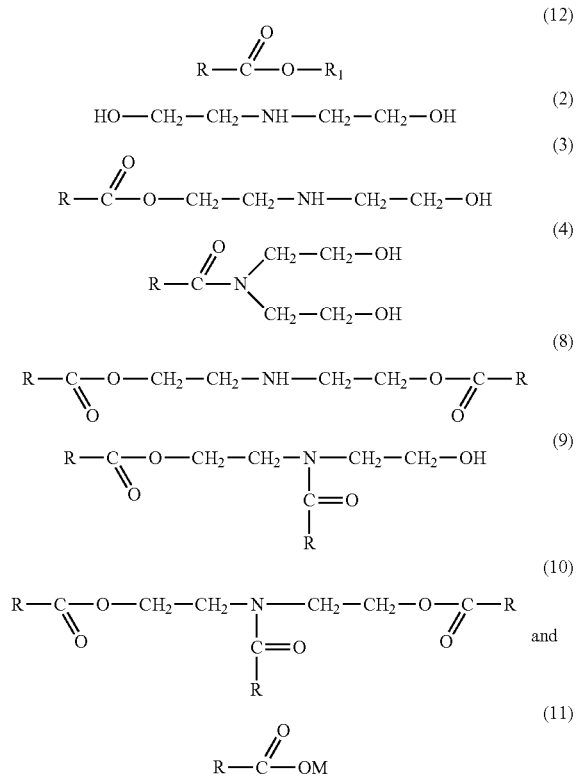

wherein R is a straight-chain saturated or unsaturated hydrocarbon having from 12 to 24 carbon atoms, preferably having 16 to 20 carbon atoms, wherein the unsaturated hydrocarbon is mono- or poly-unsaturated, and which contains 1 to 3 groups containing oxygen (carboxyl, hydroxyl, epoxy, hydroperoxy), preferably carboxyl, attached to the hydrocarbon chain as a consequence of the oxidative cleavage of a part of the original double bonds; and M is an alkali metal ion, preferably sodium or potassium.

and R1 is alkyl having 1 to 5 carbon atoms, preferably methyl.

It should be noted here that the nonionic surfactants useful in the composition of the present invention have a water number of 5-20, preferably 8-16, more preferably 10-14 (this value refers to the hydrophilic-lipophilic nature of the surfactant).

12. The polymer-surfactant composition according to any one of Points 1 to 11, wherein the co-surfactant is a reaction product of a fatty acid having 16 to 20 carbon atoms, preferably 18 carbon atoms, preferably oleic acid or mixed rapeseed and sunflower fatty acid, or vegetable oil, and polyethylene glycol having preferably an average molecular weight of 200 to 600, in particular Elain-PEG-300 ester.

13. The polymer-surfactant composition according to any one of Points 1 to 12, comprising
  a) 10-70% by weight of cocogem surfactant;
  b) 10 to 65% by weight of vegetable oil methyl ester-diethanolamine surfactant or vegetable oil-diethanolamine surfactant, or combination of 5-25% by weight of vegetable oil methyl-ester-diethanolamine surfactant and 5-40% by weight of vegetable oil-diethanolamine surfactant, where the vegetable oil is preferably rapeseed oil and/or sunflower oil;
  c) optionally from 10 to 40% by weight of a co-surfactant, which is a fatty acid or a fatty acid mixture, or a reaction product of triglyceride of fatty acids and a polyalkylene glycol having an average molecular weight of 200 to 600, preferably elain PEG-300 surfactant;
  d) 0-40% by weight of butoxyethanol or i-butanol;
  e) 10-25% by weight of polyacrylamide.

14. A process for the preparation of a polymer-surfactant composition according to any one of Points 1 to 13, comprising mixing of a nonionic surfactant based on one or more oxidized vegetable oils or a synthetic analogue thereof and/or an oxidized vegetable fatty acid alkyl-ester or a synthetic analogue thereof with an anionic cocogem surfactant and as a flow modifying agent with polyacrylamide, optionally with a co-surfactant; optionally with a phase transfer material, in any order, and homogenizing the product.

15. The process according to Point 14, wherein the oxidized vegetable oil or a synthetic analogue thereof is prepared by heating a vegetable oil or a synthetic analogue thereof in the presence of oxygen, and the oxidized vegetable fatty acid alkyl-ester or a synthetic analogue thereof is prepared by transesterification of the oxidized vegetable oil or its synthetic analogue obtained by oxidation.

16. The use of a polymer-surfactant composition according to any one of Points 1 to 13 or a product obtained according to the process of Point 14 or 15 for an enhanced oil recovery process.

17. The use according to Point 16, wherein the polymer-surfactant composition is used as an aqueous solution of 0.3 to 3.0% by weight in the oil recovery process.

18. A method for improving the efficiency of an oil recovery process, wherein before or during the start of oil recovery a) a polymeric surfactant composition according to any one of Points 1 to 3 or a product of the process according to Points 14 or 15 is introduced to the oil-containing layer; or b) first a surfactant composition produced from the components a) and b) of the polymer-surfactant composition according to any one of Points 1 to 13 or of the product obtained by the process according to Point 14 or 15, optionally together with component c), with the admixed component d), followed by the polyacrylamide component according to point e) are introduced to the oil-containing layer.

DETAILED DESCRIPTION OF THE INVENTION

For the purposes of the present invention, the term "monomeric surfactant", a "monomer surfactant", or a "surfactant monomer" shall mean a molecule comprising a hydrophobic and a hydrophilic moiety, called an ionic or non-ionic surfactant based on the hydrophilic moiety. The ionic surfactant is called anionic or cationic surfactant based on the charge of the hydrophilic moiety, i.e. the head group.

For the purposes of the present invention, the term "gemini surfactant" shall mean a molecule in which two monomeric surfactants are coupled by a small group called the "spacer" with a covalent bond.

For the purposes of the invention, "cocogem surfactant" (counterion coupled gemini surfactant) shall mean a molecule in which two or more ionic monomeric surfactants are linked electrostatically (i.e., by a non-covalent bond) by a spacer (otherwise counterion) carrying charges opposite to their head group. For example, said counterion includes, but is not limited to, a molecule containing two or three quaternary ammonium groups. The cocogem surfactants of the present invention include the compounds detailed below.

For the purposes of the present invention, the term "critical concentration for micelle formation" shall mean the minimum surfactant concentration in the solution, where spontaneous aggregation occurs, i.e., micelle formation begins.

For the purposes of the present invention, the term "diphenyl ether" shall mean a group in which two phenyl groups are linked by an oxygen atom.

For the purposes of the present invention, the term "alkenyl" shall mean a hydrocarbon group containing a single double bond.

For the purposes of the present invention, the term "alkadienyl" shall mean a hydrocarbon group containing two double bonds.

For the purposes of the present invention, the term "alkatrienyl" shall mean a hydrocarbon group containing three double bonds.

For the purposes of the present invention, the term "aromatic group" shall mean an unsaturated ring having 6 to 10 carbon atoms, containing formally consistently conjugated double bond system, containing one or two rings, wherein the two rings may be fused or isolated.

For the purposes of the present invention, "hydrodynamic molecular size" shall mean the largest geometric size of the spatial form formed in the aqueous solution.

For the purposes of the present invention, the term "glyceride-type oil" refers to a triglyceride-based (or briefly: glyceride) oil or a mixture of such oils, wherein the oil(s) is/are preferably of natural origin, i.e. of animal or plant origin, and wherein fatty acid groups contain one or more (e.g. 1 to 3) unsaturated bonds. However, the above oil/oil mixture may also include a synthetic triglyceride-based oil (preferably one or more synthetic analogues corresponding to the constituents of the vegetable oil) or may be a purely synthetic triglyceride-based oil. From a practical point of view, vegetable oils are of paramount importance because they have the necessary unsaturated bonds in the fatty acid groups and are available in large quantities.

Vegetable oils are commonly known to contain a variety of triglycerides, and vegetable oils are commonly referred to as the main ingredients. Examples of the vegetable oils detailed above are rapeseed oil, sunflower oil, olive oil, palm oil, soybean oil, coconut oil and the like, and mixtures thereof, wherein rapeseed oil and sunflower oil and mixtures thereof are preferred, and rapeseed oil is particularly preferred.

As mentioned above, the term "glyceride-type oil" as discussed above, preferably plant oil, shall include synthetic analogs of natural, preferably vegetable oil. Hereinafter, we will describe our terms for the preferred vegetable oils, while maintaining that they may likewise be interpreted as animal oils which carry one or more (e.g. 1 to 3) unsaturated bond(s) in their fatty acid groups, i.e. oils of such origin are also included in the term glyceride-type oil.

The term "synthetic vegetable oil analogue" shall refer to a synthetically produced analogue of any triglyceride component of a vegetable oil or any mixture of such synthetic analogs. By this definition, we want to avoid an unfair situation that if only vegetable oils are included in the scope of protection, then the simple way of going around the present invention opens, when one or more essential constituents of the vegetable oil in question are produced synthetically and this material, analogous in practice, is no longer considered a vegetable oil in the strict interpretation of the term. In other words, the term "vegetable oil", as used herein, shall refers to a natural vegetable oil or a synthetic analog thereof, wherein, as defined above, the synthetic analog may be any synthetic analogue of any plant constituent or any mixture of such synthetic analogue compounds. The foregoing considerations also apply to vegetable fats and transesterified derivatives (in those case synthetic variants that can be applied in a manner equivalent to the plant equivalents for the purposes of the present invention may also be prepared).

In the present description, vegetable oils and fats of the highest importance are mentioned with the proviso that they can be replaced by the synthetic analogs detailed above. Furthermore, where only a vegetable oil or vegetable fatty acid alkyl-ester is referred to, the term includes synthetic analogs.

For the purposes of the present invention, the term "sunflower fatty acid" shall mean any fatty acid or any mixture of fatty acids derived from sunflower oil.

For the purposes of the present invention, the term "rapeseed acid" shall mean any fatty acid or any mixture of fatty acids derived from rapeseed oil.

For the purposes of the present invention, the nonionic surfactant is one or more oxidized vegetable oils and/or one or more oxidized fatty acid-(C1-C5)-alkyl-ester based nonionic surfactants containing from 1 to 3 groups derived from one or more glyceride-type oxidized vegetable oils and/or one or more oxidized fatty acid-(C1-C5)-alkyl-ester, said group(s) being attached to a conventional surfactant constituent nonionic group.

The nonionic surfactant constituent group, which is not critical to the preferred properties of the present invention, because said preferred properties are primarily derived from groups derived from the oxidized oil/oxidized transesterified derivative thereof, is derived from a conventional nonionic surfactant constituent compound. Preferably, the nonionic surfactant constituent compound comprises basic nitrogen and one or more hydroxyl groups. In this case, the surfactant group is preferably derived from an alkanolamine having 2 to 12, preferably 2 to 6, more preferably 2 to 4 carbon atoms, preferably dialkanolamine, wherein said alkanolamine is preferably ethanolamine, diethanolamine, triethanolamine or a combination thereof, particularly preferably diethanolamine. The nonionic surfactant may also be a polyetheramine-type compound (preferably polyetheramine having 10 to 30 carbon atoms), which are typically exemplified by members of the Jeffamine family of compounds. The nonionic surfactant constituent compounds on their hydroxyl and amino groups (which may be primary or secondary amine) react with the other component of the nonionic surfactants of the present invention, with the vegetable oil (or a synthetic analog thereof) and/or vegetable fatty acid methyl-ester (or a synthetic analog thereof), and thus, the nonionic surfactant used in the composition of the present invention is formed.

In the preparation set of experiments of the plant oil and/or plant fatty acid methyl-ester based nonionic surfactants according to the present invention, we started from a vegetable oil base material (rapeseed oil or sunflower oil, typically rapeseed oil), prepared for another purpose and known as disadvantageous from the thermal stability point of view, said material containing oxidized vegetable oil in 5 to 35% per weight, preferably used cooking oil. The same fatty acid methyl ester derivative of the same oil obtained by industrial transesterification was also used as starting material. These materials were reacted with alkanolamine [non-limiting examples: ethanolamine, diethanolamine (DEA), triethanolamine or a combination thereof] and the properties and uses of the reaction products were investigated.

For the purposes of the present invention, the terms "cooking oil" and the term "edible oil" are used interchangeably, based on their common sense. The term "used cooking oil" refers to a cooking oil used for cooking in everyday use. Such oil is also considered to be an oxidized vegetable oil produced by the appropriate process in the claims, i.e. by heating the vegetable oil in the presence of oxygen.

For the skilled person it is known from the relevant literature (e.g., Ian Anderson et al., "Performance of Waste Vegetable Oil as a Fuel in Diesel Engines", Worcester Polytechnic Institute, Mar. 10, 2008) that, for example, in the catering industry, in the use of cooking oils they are repeatedly heated before they are disposed of as waste. Due to the heating of the cooking oils, the steam released from the food reacts with the oil (this reaction is called hydrolysis), in which a small proportion of the triglycerides is degraded to glycerol and free fatty acids. Thus, the amount of free fatty acids in an oil sample indicates how many times the oil was used. In addition, in the presence of air and with little conversion, the double bonds of vegetable oils can decompose and, as a result of the consecutive reactions in the oxidative environment, mainly compound derivatives containing epoxy, hydroxyl, hydroperoxy and carboxyl groups are formed. The amount of free fatty acids in the waste oil is typically 10-15% (M. Canakci et al., American Society of Agricultural Engineers, vol. 44 (6): 1429-1436).

It is worth mentioning that the data used to characterize the free fatty acid content of cooking oils (e.g. sunflower oil) is the acid number, which is the amount of KOH in mg required to neutralize free fatty acids in 1 g of fat. According to Directive 2-4211 of the Hungarian Alimentary Book the maximum value of acid number for refined sunflower oil cannot exceed 0.6 mg KOH/g (National Consumer Protection Authority report on comparative analysis of cooking oils http://fogyasztovedelem.kormany.hu/sites/default/files/etolajok_osszehüntito_vizsgalatarol_20 120802_honlapra.pdf).

Based on the foregoing, the cooking oil used in the preparation of said nonionic surfactants synthesized in our experiments can be regarded as an oxidized (therefore having and elevated acid number) vegetable oil raw material. In view of the foregoing, the technical content of the term "used cooking oil" is to be understood by one of ordinary skill in the art, and is a measure that is expected from the skilled person without undue experimentation to select a suitable cooking oil useful in the present invention, based on the acid number specified in the present invention.

Another way of providing the starting material is to treat the raw vegetable oil material (e.g. by air or oxygen by bubbling in the course of heating) to make it "artificially used", thereby setting the desired acid number. However, since the elimination of used cooking oil is a costly and essentially environmentally damaging process, one advantage of the present invention is that the used cooking oil can be recycled using the process according to the invention. Here we note that vegetable oils are also oxidized by prolonged exposure to air. Although the oils which were oxidized this way are not considered to be advantageous, they can also be used to increase the effect compared to compositions containing non-oxidized oil based nonionic surfactants.

In our experiments, it has been found that, during the preparation of the appropriate oxidized vegetable oil and/or oxidized vegetable fatty acid alkyl-ester (preferably methyl ester) based nonionic surfactant, the acid number of the applied oxidized vegetable oil base material is from 0.7 to 3.0, preferably from 1.1 to 2.0 mg of KOH/g, while the acid number of the oxidized vegetable fatty acid methyl ester is 0.3-0.9 mg KOH/g, preferably 0.6-0.8 KOH/g.

The preferred lower limit of the given acid number intervals is not reached by the non-oxidized vegetable oil and/or vegetable fatty acid alkyl-ester materials. It has been pointed out that as compared to the nonionic surfactants based on non-oxidized vegetable oil and/or non-ionic vegetable fatty acid alkyl-ester a better effect can be achieved using an oxidized vegetable oil and/or vegetable fatty acid alkyl ester starting material.

The characterizing value of the nonionic surfactant component is its water number because it refers to the hydrophilic-lipophilic nature of the surfactant. According to our measurements, the water number of the nonionic surfactant of acceptable quality is 5 to 20, more preferably the water number is 8 to 16, more preferably 10 to 14.

The triglyceride composition vegetable oils we use are products prepared by pressing rapeseed produced in large quantities in Hungary and, to a lesser extent, sunflower seed, which contain, for example, among others, the palmitic acid having 16 carbon atoms constituting rapeseed oil, and oleic acid having one unsaturated bond and 18 carbon atoms, α-linolenic acid having three double bonds, and linoleic acid having two double bonds. In addition to the main components, these vegetable oils may contain omega-3, omega-6 and -9 fatty acid derivatives, as well as phosphoric acid lipids and free fatty acids. The average composition of rapeseed oils is as follows: 18:1 oleic acid: 62%, 18:2 linoleic acid: 20% by weight, 18:3 α-linolenic acid: 9-10% by weight, 16:0 palmitic acid: 3-4% by weight, 18:0 stearic acid: 2% by weight, other unsaturated trans fatty acids: 4% by weight. The designation used in the above list before the name of the compounds indicates the number of double bonds present in the chain having the particular carbon number.

The polymer-surfactant composition of the present invention optionally contains one or more commercially available co-surfactants to increase the efficiency of the composition; said co-surfactants are typically the reaction product of one or more commercially available co-surfactants, such as, in particular, fatty acids having 16 to 20 carbon atoms, e.g. oleic or mixed rapeseed and sunflower fatty acids, their triglycerides and polyalkylene glycol (average molecular weight 200-600), in particular the Elain-PEG-300 ester. In view of the foregoing, the selection of the appropriate co-surfactant is within the knowledge of the skilled person and does not require undue experimentation.

The composition according to the invention preferably comprises a polyacrylamide as flow modifier, said polyacrylamide having an average molecular weight of between 1,000,000 and 20,000,000 and a hydrodynamic molecular size between 100 and 50,000 nm, preferably between 100 and 10,000 nm, more preferably between 100 and 5,000, more preferably between 100 and 1,000 nm. The hydrodynamic molecular size of the polyacrylamides in solution depends on the spatial structure of the polymer, the size of the ligands, the branching, the degree of solubility in the actual solvent, and can generally be between 100 and tens of thousands of nm.

The main polymer types used for EOR use are polyacrylamides (PAMs) having a molecular weight of $10^6$-$10^7$ g/mol, and being stable at a temperature of 60-90° C. The products that are already stable approx. up to 100° C. are copolymers of hydrolyzed acrylamides (HPAM), and acrylic ester or acrylic acid-Na salt copolymerized derivatives of partially sulphonated variants (HPAM+MAMPS), which can also be used at higher temperatures (100-140° C.). In addition, xanthan gum can be used in low temperature reservoirs (only up to 70-90° C.).

For the past 10 years, water soluble copolymers formed by acrylic acid or α-olefins with other polar components such as vinyl acetate and styrene, maleic anhydride, vinylpyrrolidone have been described in the literature for the preparation of polyacrylic acid and the derivatives of similar structure. However, data on industrial applications of these new types have not yet been found.

Based on the above, most of the knowledge related to the application have been published about polyacrylamide derivatives containing basic N, especially in the case of partially hydrolyzed polyacrylamide derivatives (Raffa, Patrizio; Broekhuis, Antonius A.; Picchioni, Francesco: Polymeric surfactants for enhanced oil recovery, Journal of Petroleum Science and Engineering, 2016, DOI: 10.1016/j.petrol.2016.07.007).

The polymer surfactant composition of the present invention has so far only partially hydrolyzed polyacrylamide-type flow modifying polymers of various composition. In spite of the differences between the properties of the individual polymers, effectiveness increasing synergies between the surfactant composition of the present invention and the polymers tested were detectable in each application. According to the relevant literature, at present, 99% of polymer uses for EOR are based on the use of basic polyacrylamide derivatives. However, it is assumed that the found polymer-surfactant synergy based on the increased polarity of the nonionic surfactants of the present invention can be exploited to increase the production of excess oil by the use of the majority of present and future polymer types exhibiting similar polarity features.

In the light of the present disclosure, the choice of the appropriate polyacrylamide is within the knowledge of the skilled person. For example commercially available polyacrylamides (PAMs) typically having an average molecular weight above 2,000,000, typically having an average molecular weight less than 20,000,000, or partially hydrolysed variants thereof (HPAM), or the copolymerized variants of acrylic acid amide monomers with monomers containing olefinic double bond, having various polar molecular structures, such as vinyl acetate, vinylpyrrolidone or maleic anhydride are useful. Due to the various conditions of the oil storage layers, in particular the wide range of the temperature of the layer (25-140° C.) and the wide range of the salt content of the layer water (2-250 g/dm$^3$), and composition of the reservoir, different types of flow modifying polyacrylamides adapted to the yield conditions have been developed. Thermal stability was achieved with the sulphonic acid ester groups grafted on the polymer chain and the solubility in water was achieved by increasing the degree of hydration of the functional groups. The choice of the type of the fluid-modifying polyacrylamide to be used in practice is therefore the responsibility of the skilled person based on the knowledge of the particular conditions of use. Extensive studies of the usefulness of the vegetable oil-based products produced by the present invention have shown that, due to their excellent surfactant properties, they can particularly advantageously replace the 100% synthetic, nonionic surfactants and compositions containing them with similar hydrophilic-lipophilic balance (HLB) used so far in the enhanced oil extraction technologies, or as cooler-lubricating materials and other cleansing, degreasing and emulsifying surfactant compositions. In the present invention, the oxidized vegetable oil or transesterified derivative thereof used as the base material for the nonionic surfactant is more complex in composition due to the oxidation in the fatty acid moiety, but it is predominantly renewable, has natural origin, and has achieved unexpected and surprising increase in crude oil displacement in practical use.

In the following points I to IV the most important components that can be used in the implementation of the present invention are described below in further detail.

I. The anionic cocogem surfactants useful in the present invention include, but are not limited to, the following compounds, and cocogem surfactant mixtures containing one or more of the following:
  i) a 2:1 proportion salt of 4-($C_{10}$-$C_{13}$-sec-alkyl)-benzenesulphonic acid, where typically 90% is $C_{12}$ alkyl (CAS No. 85536-14-7, EC number: 287-494-3) and various diamines or a 3:1 proportion salt of 4-($C_{10}$-$C_{13}$-sec-alkyl)-benzenesulphonic acid, where typically 90% is $C_{12}$ alkyl (CAS No. 85536-14-7, EC number: 287-494-3) and various triamines, or
  ii) a 2:1 proportion salt of ($C_{14}$-$C_{16}$ sec-alkyl)-sulphonic acid (CAS No. 97489-15-1) and various diamines or a 3:1 proportion salt of ($C_{14}$-$C_{16}$ sec-alkyl) sulphonic acid (CAS No. 97489-15-1) and various triamines, or
  iii) a 2:1 proportion salt of ($C_{14}$-$C_{16}$-alpha-olefin)-sulphonic acid (CAS No. 68439-57-6) and various diamines or a 3:1 proportion salt of ($C_{14}$-$C_{16}$-alpha-olefin)-sulphonic acid (CAS No. 68439-57-6) and various triamines, or
  iv) a 2:1 proportion salt of oleic acid-(cis-9-octadecanoic acid, CAS No. 112-80-1) and various diamines or a 3:1 proportion salt of oleic acid-(cis-9-octadecanoic acid, CAS No. 112-80-1) and various triamines More specific examples of preferred anionic cocogem surfactants include:

a) bis(4-(2-alkyl)benzene-sulphonate)-poly(propyleneglycol)-bis(2-ammonium-propyl)-ether salt (DBSJ) anionic cocogem surfactant;

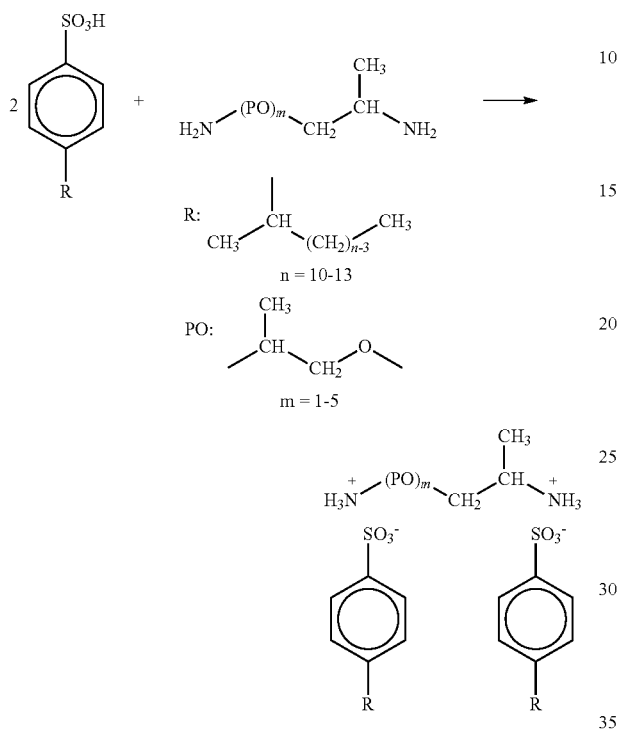

b) 2-methylpentane-1,5-diammonium-bis(4-(sec-alkyl)-benzene-sulphonate)

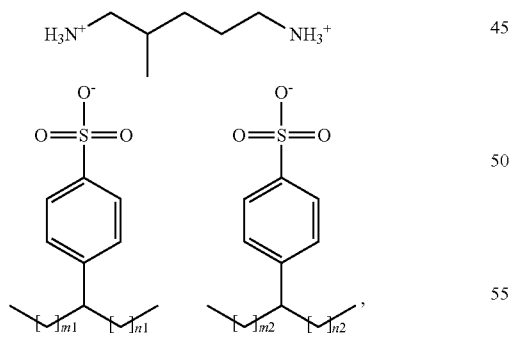

wherein m1+n1=7-10, m2+n2=7-10 and m1, m2, n1 and n2 are independently integers of 0-10. A representative member of the above product mixture is the following compound:

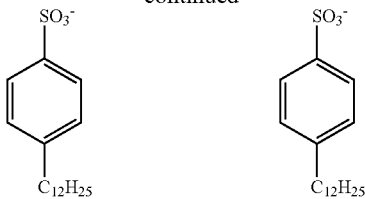

wherein $C_{12}H_{25}$ is n-dodecyl.

c) 3,3'-imino-bis(N-dimethylpropyl-ammonium)-tris 4-(sec-alkyl) benzene sulphonate)

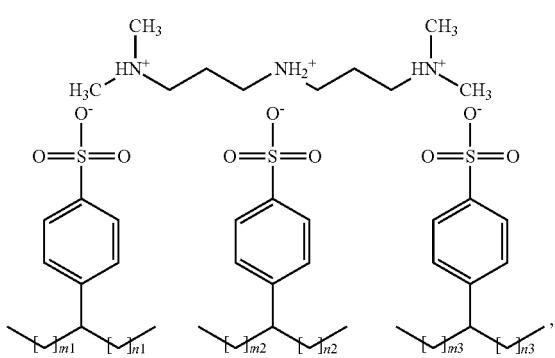

wherein m1+n1=7-10, m2+n2=7-10, m3+n3=7-10 and m1, m2, m3, n1, n2 and n3 are independently integers of 0-10. A representative member of the product mix is the following compound:

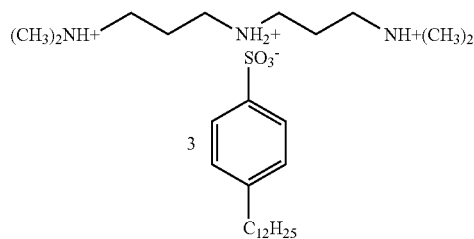

wherein $C_{12}H_{25}$ is n-dodecyl d) bis($C_{14}$-$C_{17}$-sec-alkyl)-sulphonate-poly(propyleneglycol)-bis(2-ammonium propyl)-ether salt [IUPAC: O,O'-bis(2-aminopropyl)polypropylene glycol)-bis($C_{14}$-$C_{17}$ sec-alkane sulphonate)]

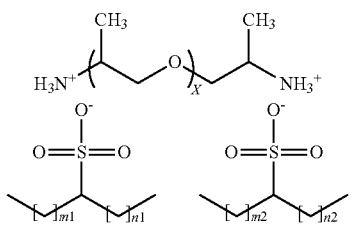

where x is about 2.5, m1, n1, m2 and n2 are independently integers of 0-14 and m1+n1=11-14 and m2+n2=11-14.

e) bis($C_{14}$-$C_{17}$ sec-alkyl)-sulphonate)-poly(propyleneglycol)-bis(2-ammonium-propyl)-ether salt;

f) 2-methylpentane-1,5-diammonium-bis($C_{14}$-$C_{17}$ sec-alkylsulphonate)

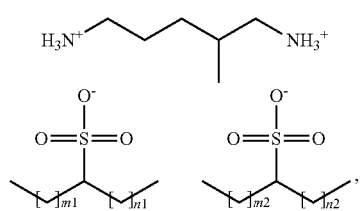

where m1, n1, m2 and n2 are independently integers of 0-14 and m1+n1=11-14 and m2+n2=11-14;

g) bis($C_{14}$-$C_{16}$a-alpha-olefin)-sulphonate-poly(propylene-glycol)-bis(2-ammonium-propyl)-ether salt (IUPAC: O,O'-bis(2-aminopropyl)-polypropylene-glycol)-bis(alpha olefin-sulphonate)]

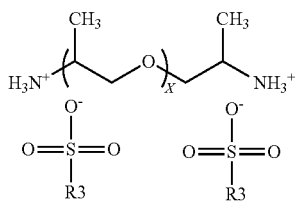

wherein x is about 2.5 and R3 is $C_{14}$-$C_{16}$ alpha-olefin;

h) bis(oleate)-poly(propylene-glycol)-bis(2-ammonium-propyl)-ether salt (IUPAC: O,O'-bis(2-aminopropyl)-polypropylene-glycol-bis(cis-9-octadecanoate)

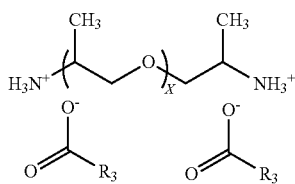

wherein x is about 2.5 and R3 is cis-8-heptadecenyl.

i) examples of additional anionic cocogem surfactants, including the starting materials used to produce them, are the following:

TABLE 1A

Starting materials used to produce additional anionic cocogem surfactants

| Starting diamine/triamine (A) | Starting sulphonic acid (S) | A:S | Molar weight or average molar weight |
|---|---|---|---|
| Jeffamine D400 | DB | 1:2 | 1053 |
| Jeffamine D400 | TPB | 1:2 | 1044 |
| Jeffamine D230 | TPB | 1:2 | 874 |
| Jeffamine D400 | K | 1:2 | 1044 |
| 2-methyl-1,5-diaminopentane | DB | 1:2 | 769 |
| Jeffamine D230 | alfa-olefin | 1:2 | 846 |
| Jeffamine D230 | K | 1:2 | 874 |
| 2-methyl-1,5-diaminopentane | K | 1:2 | 760 |
| 2-methyl-1,5-diaminopentane | TPB | 1:2 | 760 |

TABLE 1A-continued

Starting materials used to produce additional anionic cocogem surfactants

| Starting diamine/triamine (A) | Starting sulphonic acid (S) | A:S | Molar weight or average molar weight |
|---|---|---|---|
| 2-methyl-1,5-diaminopentane | szek-alkán | 1:2 | 728 |
| 1,6-hexane-diamine | DB | 1:2 | 769 |
| c•hexyl | DB | 1:2 | 795 |
| 1,4-butane-diamine | DB | 1:2 | 741 |
| 4,9-dioxa-1,12-dodecane-diamine | DB | 1:2 | 857 |
| $(PO)_{xyz}$-N | DB | 1:3 | 1419, 5 |
| $(PO)_{xyz}$-N | 2DB + HCl | 1:3 | 1129, 5 |
| $(PO)_{xyz}$-N | TPB | 1:3 | 1406 |
| $(PO)_{xyz}$-N | sec-alkane | 1:3 | 1358 |
| TMDPT | DB | 1:3 | 1167 |
| TMDPT | 2DB + HCl | 1:3 | 877 |

Abbreviations used in the table:
DB: n-dodecylbenzene-sulphonic acid (Lutensit A-LBS, BASF AG.)
TPB: sec-alkylbenzene-sulphonic acid (Ufacid TPB, Unger A.S.)
K: linear alkylbenzene-sulphonic acid (Ufacid-K, Unger A.S.)
sec-alkane: (C14-C17-sec-alkyl)-sulphonic acid (Hostapur SAS 60, Clariant GmbH.)
alpha-olefin: (C12-C14 alpha-olefin)-sulphonic acid (Hostapur OS liquid, Clariant GmbH.)
c•hexyl: cyclohexylbis-methylenamine
$(PO)_{xyz}$-N: Jeffamine-polyoxyalkyl-triamine (T-403 Huntsman Corp.) with the following structure:

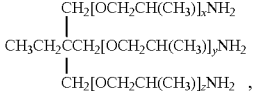

where x+y+z=5 (average molecular weight: 440)
TMDPT: tetramethyl-dipropylene-triamine (Z-130 Huntsman Corp.) with the following structure:

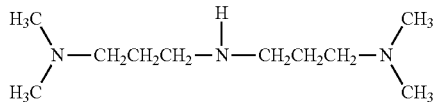

II. The crude vegetable oil containing 5 to 35% by weight of used cooking oil, preferably used in the preparation of the nonionic surfactant of the present invention, is typically based on rapeseed oil, optionally containing varying amounts of sunflower oil, where the concentration of the more than twice unsaturated fatty acid derivatives in the crude vegetable oil may exceed 65% by weight. Such partially oxidized compounds also involve their epoxy, hydroxyl, hydroperoxy, and carboxyl groups in reactions with alkanolamine, for example in the given specific case with diethanolamine, resulting in a very diverse composition of the resulting product. Thus, the oxidized vegetable oil base material of the present invention and the alkyl-alcohol transesterified derivatives thereof, i.e. the fatty acid C1-C5 alkyl esters, preferably methyl esters thereof, contain—in addition to the main components detailed below—a number of components with low concentration, said components being structurally difficult to identify and hardly separable by even very precise analytical methods.

By reacting such multi component materials with alkanolamine, such as diethanolamine, the fatty acids and their partially oxidized derivatives in the reaction mixture primarily generate the derivatives of monoester, monoamide, ester-amide, diester, monoglyceride, and alkali metal salt of fatty acids, and unreacted starting materials such as alkanolamine for example diethanolamine and vegetable oil are present, or in case of transesterification, the rapeseed fatty acidalkyl-ester and glycerin by-product can be detected.

To characterize and control the quality of these multi component raw materials and their end-products obtained in chemical transformation, in practice the determination of their easy to measure physical and chemical properties are used. In view of this, besides their physical properties, the basic materials of the present invention used, as well as the surfactant products derived therefrom, may be characterized by the acid number of the raw material mixture and the intermediate product and the water number of the end product, which characterizes the hydrophilic-lipophilic nature of the surfactant compounds.

Gel chromatography was used to identify the major molecular structure groups for the composition analysis. In our experience, in case of the surfactants of the present invention, which are based on vegetable oil and plant fatty acid alkyl ester, after the reaction with alkanolamine, such as diethanolamine, the main types of compound present in the product (which can be separated by their average molecular weight) can be classified into the following four structural groups:

1. fatty acid monoester and fatty acid amide
2a. fatty acid diester and fatty acid monoester amide,
2b. fatty acid diester amide,
2c other by-product components;
3. low molecular weight unreacted starting material and catalyst by-product components.

For other alkanolamines, suitable fatty acid esters, fatty acid amides, fatty acid ester amides, and the like, and the unreacted starting materials can be determined analogously, the recognition of the process is within the knowledge of one of ordinary skill in the art.

The relative concentration of the major components belonging to the above-listed structural groups can be calculated by comparing the area of the chromatogram peaks of the components with similar molecular weight (optionally, only differing in said molecular weight due to oxidation) with the total area of the compounds, for the purpose of qualitative comparability, where the chromatograms are determined by high pressure gel chromatography. The starting molar ratios of the starting materials of the synthesis and the reaction parameters (temperature, reaction time, method of adding of the reagents) can be used to control the proportions of the components. Based on this data, the preferred compositions of nonionic surfactant compositions for the efficiency point of view using the preferred alkanolamine, such as diethanolamine, are as follows:

Group 1: at least 70% by weight of fatty acid monoester and fatty acid-amide,
Group 2a: up to 15% by weight, preferably up to 10% by weight of fatty acid-diester, and/or fatty acid-monoester-amide,
Group 2b: up to 10, preferably up to 5% by weight of fatty acid-diester,
Group 2c up to 10, preferably up to 5% by weight of other low-concentration by-product components, such as vegetable oil base material, glycerol and its mono- and diester derivatives;
Group 3: up to 20% by weight, preferably up to 15% by weight of unreacted starting material (e.g. diethanolamine, vegetable oil or methyl ester of transesterification), and catalyst by-product components.

However, it is underlined that the practical applicability of the starting vegetable oil and/or the plant fatty acid alkyl ester based nonionic surfactant is most easily characterized by the acid number of the starting mixture, because it clearly correlates with the positive properties of the starting material, as our observations suggest that free carboxyl groups play a decisive role in the development of excellent properties of the end product.

In particular, the nonionic surfactant component based on one or more vegetable oils and/or plant fatty acid-alkyl-esters (preferably methyl-esters) of the present invention is a reaction product of the following materials:

a) an oxidized vegetable oil base material having an acid number of from 0.7 to 3.0 preferably from 1.1 to 2.0 mg KOH/g and/or a plant fatty acid methyl ester base material having an acid number of 0.3 to 0.9 mg KOH/g and
b) an alkanolamine, preferably an alkanolamine having 2 to 6 carbon atoms or 2 to 4 carbon atoms, such as ethanolamine, diethanolamine, triethanolamine or a combination thereof, more preferably diethanolamine.

The reaction is carried out at a temperature of from 140 to 170° C. for a reaction time of 1 to 12 hours, preferably 2 to 8 hours, in the presence of 0.2-1.0% inorganic alkali, preferably KOH or NaOH catalyst.

The reaction products according to the following points (i) to (vi) and combinations thereof are preferred:

i) The vegetable oil base material contains vegetable oil, in which the fatty acid moiety in its molecular structure has at least 90% by weight 16 to 20 carbon atoms, in particular rapeseed oil and/or sunflower oil, mixed with 5-35% by weight used cooking oil with an acid number of from 2.0 to 4.0 mg KOH/g based on the weight of the total vegetable oil.
ii) The vegetable oil base material may contain a synthetically oxidized derivative of a vegetable oil, in which the fatty acid moiety in its molecular structure has at least 90% by weight 16 to 20 carbon atoms in its molecular structure, particularly rapeseed oil and/or sunflower oil, wherein the starting raw vegetable oil is typically oxidized at a temperature from 20 to 200° C., preferably at 170° C. from 1 to 12 hours, preferably from 1 to 8 hours, by bubbling air stream at 10-30 $dm^3/h$, preferably at 20 $dm^3/h$, to directly produce the desired oxidized vegetable oil intermediate having an acid number of from 0.7 mg to 3.0 mg, preferably 1.1 to 2.0 mg KOH/g, and a viscosity of up to 100 mPas at 25° C. When oxidation to a higher acid number is achieved, this oxidized oil is mixed with non-oxidized oil to produce the oxidized oil base with the desired acid number.

Subsequently, the vegetable oil base material according to i) or ii) is reacted with alkanolamine, preferably diethanolamine (DEA) to yield the final product.

If the oxidized oil of ii) and the preferred diethanolamine (see materials (1) and (2) below) are used as starting materials, the final product typically comprises materials selected from the group consisting of fatty acid-diethanolamine-monoester (3), fatty acid diethanolamide (4), glycerol (5), fatty acid-glycerol-monoester (6), fatty acid-glycerol-diester (7) fatty acid-diethanolamine-diester (8), fatty acid-diethanolamine-monoester-amide (9) and fatty acid-diethanolamine-diester-amide (10). In addition, the mixture contains small amounts of unreacted oil (1) and unreacted diethanolamine (2) components, and other by-products, such as the fatty acid alkali metal salt formed by the reaction of the alkaline material (preferably NaOH or KOH) used as the catalyst with fatty acids, preferably fatty acid-Na-salt or fatty acid-K-salt (11). The abovementioned formulas are the following:

Scheme 1

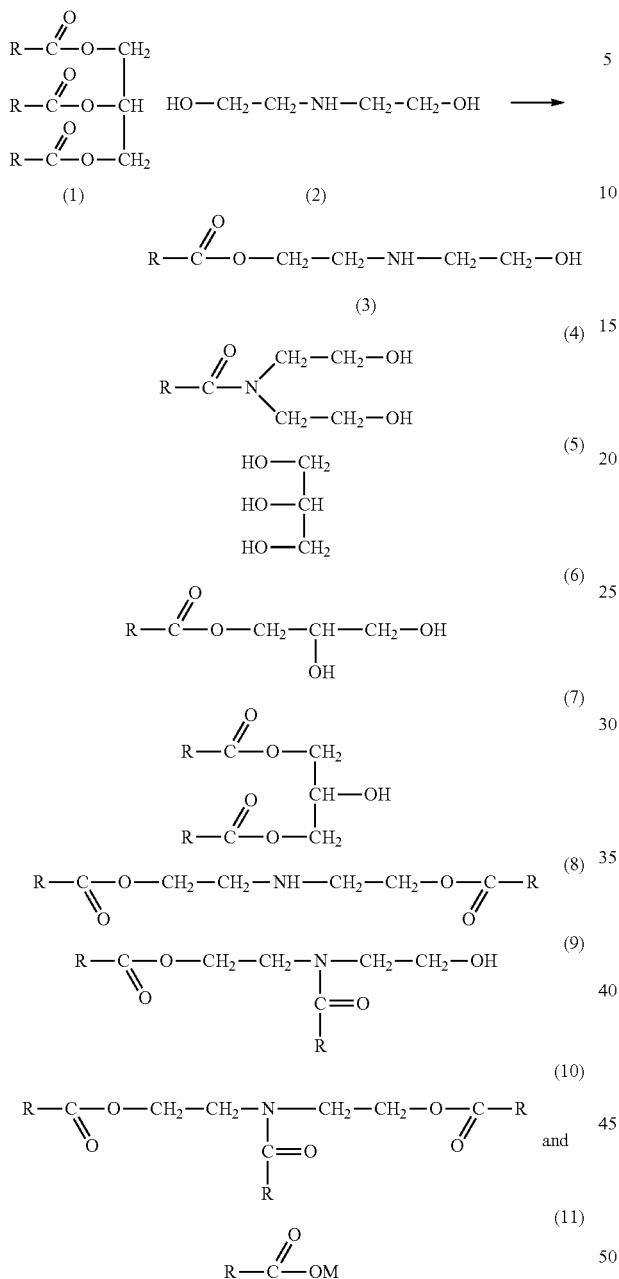

wherein R is a straight-chain saturated or unsaturated hydrocarbon having from 12 to 24 carbon atoms, preferably having 16 to 20 carbon atoms, wherein the unsaturated hydrocarbon is mono- or poly-unsaturated, and which contains 1 to 3 oxygen containing groups (carboxyl, hydroxyl, epoxy, hydroperoxy), preferably carboxyl, attached to the hydrocarbon chain as a consequence of the oxidative cleavage of a part of the original double bond; and M is an alkali metal ion, preferably sodium or potassium.

iii) A reaction product according to ii) is preferred wherein the combined concentration of the fatty acid monoester (3) and the fatty acid amide (4) is at least 70% by weight. The combined concentration of glycerol mono- (6) and diester (7) (which are present due to triglyceride structure of vegetable oil) and other diester (8), ester-amide (9) and diester-amide (10) by-products components is up to 20% by weight, preferably less than 15% by weight. Unreacted diethanolamine, vegetable oil, and other low concentration materials have a combined concentration of up to 20% by weight, preferably less than 15% by weight. In particular, the concentration of the fatty acid alkali metal salt, preferably the fatty acid Na- or K-salt, resulting from the reaction of the inorganic alkali, preferably NaOH or KOH, used as the catalyst, with vegetable fatty acids, is preferably less than 5% by weight.

iv) Furthermore, the reaction product of point i) is preferred, to which the vegetable oil material used is the product obtained by pressing at least 60% by weight of rapeseed, and not more than 40% by weight of sunflower seed, comprising palmitic acid, oleic acid, α-linolenic acid, and linoleic acid, and optionally omega-3, omega-6 and -9 fatty acid derivatives, as well as phosphoric acid lipids and free fatty acids such as, in particular, stearic acid and unsaturated trans fatty acid.

v) In another embodiment, the vegetable oil base material according to point i) or ii) (which may be a mixture of vegetable oil and used oil or artificially produced from vegetable oil by oxidation) is also used, which is first transesterified (preferably by conventional industrial transesterification, see e.g. methods for producing biodiesel), to obtain a material containing vegetable fatty acid-methyl-ester (when transesterification is performed with methyl alcohol, but other alcohols having 1 to 5 carbon atoms, such as ethanol may of course also be used).

In the case of transesterified fatty acid and diethanolamine starting materials, the final product typically comprises the materials according to Scheme 2: fatty acid-diethanolamine-monoester (3), fatty acid-diethanolamide (4), fatty acid-diethanolamine-diester (8), fatty acid-diethanolamine-monoester-amide (9), fatty acid-diethanolamine-diester-amide (10). Furthermore, the mixture contains a small amount of unreacted fatty acid-alkyl-ester (12) and diethanolamine (2), and other by-products, such as the fatty acid-alkali metal salt formed by the reaction of the alkaline material (preferably NaOH or KOH) used as the catalyst with fatty acids, preferably fatty acid Na salt or fatty acid K-salt (11).

Scheme 2

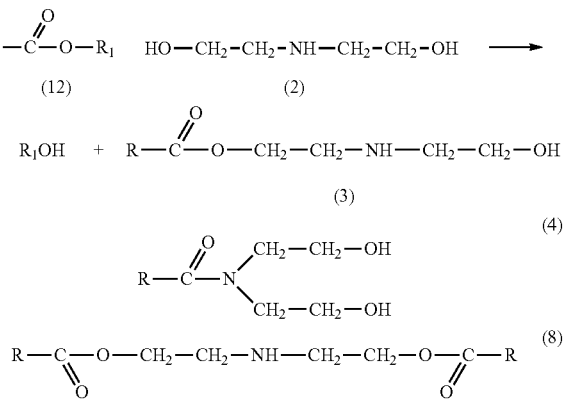

-continued

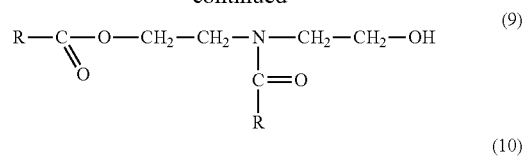

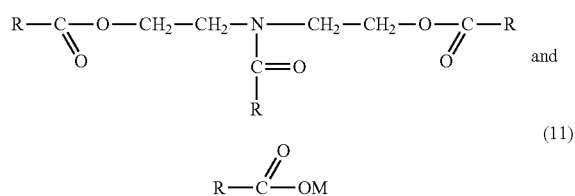

wherein R is a straight-chain saturated or unsaturated hydrocarbon having from 12 to 24 carbon atoms, preferably having 16 to 20 carbon atoms, wherein the unsaturated hydrocarbon is mono- or poly-unsaturated, and which contains 1 to 3 groups containing oxygen (carboxyl, hydroxyl, epoxy, hydroperoxy), preferably carboxyl, attached to the hydrocarbon chain as a consequence of the oxidative cleavage of a part of the original double bonds; and M is an alkali metal ion, preferably sodium or potassium.

vi) Preferably, in the reaction product according to point v), the component ratios are as follows: the combined concentration of the monoester (3) and amide (4) is at least 70% by weight; the amount of other product components is up to 20%, preferably less than 15% by weight; in particular, the combined concentration of the diester (8) and the monoesteramide (9) is less than 15% by weight, and the concentration of the diester-amide (10) is at most 5%. The unreacted fatty acid-alkyl-ester (12) and diethanolamine (2), together with other low concentration materials, have a combined concentration of up to 20% by weight, preferably 5-15% by weight. Within this, the concentration of the alkali metal salt (11) resulting from the reaction of the alkaline catalyst, preferably fatty acid-Na salt or the fatty acid-K salt, is below 5% by weight, and the concentration of methanol produced during the reaction is below 1% in the reaction product.

Based on the above, it can be stated that the combined concentration of monoester (3) and amide (4) in the one or more glyceride-type oxidized oil-based nonionic surfactant and/or oxidized fatty acid C1-C5 alkyl ester-based nonionic surfactant is equally at least 70% by weight. Therefore, preferably, the nonionic surfactant composition is composed of the following:

Group 1: at least 70% by weight of fatty acid-monoester (3) and fatty acid-amide (4);
Group 2: up to 20% by weight of other reaction products;
Group 3: up to 25% by weight, preferably up to 15% by weight of unreacted starting material and catalyst by-product and other by-products.

More preferably, the composition is as follows:
Group 1: at least 70% by weight of fatty acid-monoester (3) and fatty acid-amide (4);
Group 2a: up to 15% by weight, preferably up to 10% by weight of fatty acid-diester (8) and/or fatty acid-monoesteramide (9);
Group 2b: up to 5% by weight of fatty acid-diesteramide (10);
Group 2c: up to 5% by weight of other low-concentration by-product components such as in case of vegetable oil base material glycerol (5) and its mono- and diester derivatives (6 and 7), see Scheme 1;
Group 3: up to 20% by weight, preferably up to 15% by weight of unreacted starting material such as diethanolamine (2), vegetable oil (1) or fatty acid alkyl ester (12), and catalyst by-product (11).

DETAILS OF THE PREPARATION PROCESSES

Preparation Method 1

The details of preparation of a non-ionic surfactant based on vegetable fatty acid by the reaction of a vegetable oil and diethanolamine (DEA) is described below.

The oil used for the synthesis preferably contains vegetable oil having at least 90% by weight fatty acid moiety having 18 carbon atoms in its molecular structure, in particular rapeseed oil and/or sunflower oil, mixed with 5-35% by weight of oxidized vegetable oil calculated on the total weight of the base vegetable oil, said oxidized vegetable oil having up to a maximum of 4.0 mg KOH/g acid number; and/or mixed vegetable cooking oil collected from the food industry.

The vegetable oil base material may also be a crude vegetable oil, preferably rapeseed and/or sunflower oil, which is typically oxidized at 170° C. for 1 to 8 hours by bubbling an air flow rate of 20 dm³/h to obtain the desired intermediate product with acid number of 0.7-3.0, preferably 1.1-2.0 mg KOH/g and with up to 100 mPas viscosity at 25° C.

The above described vegetable oil base was reacted with diethanolamine in 1:1 to 1:8 molar ratio relative to the total free carboxyl groups and carboxyl groups in esteric bonds, to give the main reaction products shown in Scheme 1 above. Accordingly, R is a hydrocarbon group derived from rapeseed and/or sunflower oil, which, as a result of the oxidative cracking of some of its unsaturated double bonds, contains 1 to 3 groups attached to the hydrocarbon chain (—COOH, —OH, —OOH, epoxy), preferably a carboxyl group. M is potassium.

The means of controlling the product ratios are: temperature (140-190° C.), reaction time (1-12, preferably 4-8 hours), starting reagent molar ratios (oil/DEA=1:1-1.8) and catalyst weight ratio (0.2-2.0% by weight).

Preparation Method 2

According to another particular method of the invention, a plant fatty acid based nonionic surfactant (RME-DEA) is produced by reaction of rapeseed fatty acid-methyl-ester (RME) and diethanolamine (DEA), said method is described below.

The preparation of a preferred rapeseed oil methyl ester (RME) based surfactant composition according to the invention (corresponding to the conventional industrial preparation of RME): at a temperature of 20 to 30° C. to rape fatty acid-methyl-ester (RME) base material having 0.6 mg KOH/g acid number, in 1:1 1.8 molar ratio diethanolamine, and, based on the weight of the reaction mixture, 1-2% by weight of NaOH in the form of solid pellets were admixed, and the reaction mixture was heated to 150 to 190° C. with continuous stirring, and the methanol formed during transesterification was boiled out and collected in a condensation vessel suitable for this purpose, then, after termination of the formation of methanol, it was boiled out of the reaction mixture, and the reaction product is cooled to room temperature.

Reaction products of RME and diethanolamine (DEA) prepared by transesterification from the above mixtures are shown in Scheme 2.

R is logically a group derived from rapeseed oil which, due to the oxidative cracking of a part of the double bonds in the unsaturated hydrocarbon moiety, contains 1 to 3 groups (—COOH, —OH, epoxy), preferably a carboxyl group attached to the hydrocarbon chain; R1 is —CH$_3$, M is potassium.

The means of controlling product ratios are: temperature (140-190° C.), reaction time (1 to 12 hours), starting reagent molar ratios (fatty acid alkyl ester/DEA=1:1 to 1.8) and catalyst weight ratio (0.2 to 2.0%).

General Example 3

In general, as regards the oxidized base materials used for the production of nonionic vegetable fatty acid based surfactants, it is mentioned that they can be prepared by passing hot (preferably 120-200° C., preferably 170-180° C.) air through the raw (industrial) vegetable (rape, sunflower or the like) oil, until the acid number of the oxidized oil reaches the appropriate range, i.e., between 0.7 and 4.0, preferably between 1.1 and 2.0, mg of KOH/g. In an alternative way to produce an oxidized vegetable oil base material having the desired acid number, the low acid number industrial vegetable oil is mixed with a suitable amount of used cooking oil to achieve the preferred acid number range of 1.1 to 2.0 mg KOH/g.

From these ingredients, using the preparation method 1, the nonionic surfactant with the desired efficacy is obtained.

The Starting Materials Used in the Examples

The following table shows the typical characteristics of the raw materials used to produce the nonionic surfactants of the present invention.

TABLE 1

Typical characteristics of raw materials used to produce nonionic surfactants

| Base materials | RME* | Vegetable oil mixture ** | DEA |
|---|---|---|---|
| Density $d_4^{20}$ (kg/m$^3$) | 875-900 | 917.0-917.5 | 1090.0-1097.0 |
| Kynematic viscosity at 40° C. (mm$^2$/s) | 3.5-5.0 | 7.5-9.0 | 10.1-10.3 |
| Fire point (° C.) | 110-162 | min. 305 | 138-176 |
| Acid number (mg KOH/g) | 0.3-0.5 | 1.2-1.7 | — |
| Saponification number (mg KOH/g) | — | 185-193 | — |
| Iodine number (g I$_2$/ 100 g base material) | 107.5-108.5 | 100.0-126.0 | — |

*base material: rapeseed oil containing up to 35% of domestic used cooking oil having at most 4 mg KOH/g acid number,
** oxidized vegetable oil mixture.

In the case of the vegetable oil described in Table 1, it was found that, in addition to the typical data for this type of material, its acid number was substantially higher than the upper limit of 0.6 mg KOH/g acid number of crude, filtered, demucilaged plant oils. The acid number of the RME methyl-ester derivative was also close to the quality limit. Measured acid number values higher than normal acid numbers can be explained by the maximum 15% by weight content of free fatty acids of used cooking oils mixed with rapeseed oil.

The following table shows the typical characteristics of the nonionic surfactants prepared according to the invention, and surfactants used as co-surfactants in the present invention.

TABLE 2

The characteristics of the non-ionic surfactants prepared according to the present invention, and commercial surfactants used as co-surfactants based on the manufacturer's report

| Characteristics of the reaction products | Oxidized RME-DEA | Oxidized vegetable oil mixture- DEA | Elain- PEG- 300 ester* | Testing method |
|---|---|---|---|---|
| $d_4^{20}$ (kg/m$^3$) | 980-985 | 1015-1020 | 990-1120 | ASTM D974 |
| Kynematic viscosity at 100° C. (mm$^2$/s) | 14.0-18.0 | 23.4-24.1 | 7.9 | ISO 3679: 2004 |
| Fire point (° C.) | min. 180 (lowest acceptable limit) | min. 175 | min. 200 | ASTM D445-06 |
| Water number (cm$^3$/g) | 12.0-14.6 | 11.0-14.5 | 7.5-9.6 | Method 1 |
| Saponification number (mg KOH/g) | 102.1-119.0 | 93.0-95.0 | — | ASTM D2024-09 |
| Solubility in oil | complete | complete | complete | Visual |
| Solubility in water | partial | partial | partial | Visual |
| Total monoester és amide content ** (% by weight) | 81.0-95.0 | 70-90 | — | Method 2 |
| Total diester és ester- amide content ** (% by weight) | below 5% | below 5% | — | Method 2 |
| Emulsifying effect at 20° C. (middle phase volume %) | 80-100 | 80-100 | 0-20 | Method 3 |
| Oil displacement effect at 80° C. (mm) | 15-35 | 15-35 | 15-25 | Method 4 |

*Product under KOMAD-704 commerial name; commercial surfactant manufactured by MOL Lub Kft. which is elain PEG-300 ester.
** The composition of components of the nonionic surfactants according to the present invention was determined by gel chromatography using a Cecil HPLC apparatus.

Method 1: The assay is for the determination of the hydrophilic-lipophilic nature of surfactants, developed by Greenwald, Brown and Fineman (P. Becher: Emulsions, MK Bp., 1965). 1 g of the substance to be examined is weighed on an analytical balance and then dissolved in 30 cm$^3$ of a previously prepared mixture of cyclohexane dioxane (4% cyclohexane). The such prepared sample is then titrated with distilled water until residual turbidity is observed. The number of cm's of distilled water for turbidity indicating the end point of the titration gives the water number of the substance to be examined. In such multi-component systems, this value can be used to characterize the hydrophilic-lipophilic character instead of the HLB number, which is an essential property of surfactants.

Method 2: Determination of composition by GPC. Test conditions: solvent (eluent): tetrahydrofurane; solvent flow rate: 1 ml/min; temperature: 35° C.; columns used for separation: Ultrastyragel 10000 A, 1000 A, 100 A pore diameter columns, RI detector.

Method 3: The assay is based on weighing a specified amount of the mineral oil and the aqueous surfactant solution in layer water containing the surfactant composition to be examined together, then the phases are shaken, then the volume ratio of the formed phases was measured, and the thermal stability of the emulsion formed was determined using heat treatments. During the test procedure, a 10 cm$^3$ of aqueous solution of 1% emulsifier in layer water and 10 cm$^3$ of mineral oil were added successively to the measuring cylinder. After shaking at room temperature for 7 full cycles, the amounts of the aqueous phase and the intermediate (emulsion) phase are read at 30 minutes and 60 minutes. The tube was sealed with a stopper and placed in a thermostat at 80° C., shaken again, and the number of phases was re-read after 60 minutes. Measurement data were expressed as % by volume of the total volume of liquid for the aqueous and emulsion phases (P. Becher: Emulsions. MK Bp., 1965).

Method 4:

During the measurement, the specified amount of the mineral oil to be examined is dropped onto the pre-prepared layer and then run in a layer water, the composition of which corresponds to that of the reservoir, containing 1% of the emulsifier. The displacement of the upper edge of the oil spill from the center of the droplet is determined in mm unit. To prepare the assay procedure, the thin layer is first prepared. 15 cm$^3$ of the 1% surfactant-containing layer water is poured into the cylindrical test tube, the glass plate is inserted and the tube is sealed with aluminum foil. After 24 hours of run, the plate is removed from the tube and the distance between the place of the droplet and the edge of the oil spill is measured. Measured displacements are given in mm units.

The table below shows preferred compositions of the polymer-surfactant compositions of the present invention.

cooking oil based on crude rapeseed oil (thermally treated, oxidized vegetable oil mixture) (RMEcrude+ox) was compared to the methyl ester produced by the transestrification of alimentary refined rapeseed oil (RMErefin). The data clearly showed that rapeseed oil-methyl-ester product produced from oxidized oil and a mixture of crude (unrefined) rapeseed oil, (RMEcrude+ox), had a higher acid number and higher viscosity, i.e. contains relatively more acidic polar groups capable of interactions than a methyl-ester product made from refined rapeseed oil (RMErefin). Since said acidic polar group is typically a carboxyl group, in the following it is generally referred to as carboxyl groups, however, not excluding the presence of polar groups containing other oxygen atoms.

TABLE 3

Preferred composition ranges and use for the polymer-surfactant compositions of the present invention

| The composition of the surfactant composition according to the present invention (% by weight) | Type containing RME-DEA surfactant (% by weight) | Type containing vegetable oil-DEA surfactant (% by weight) | Type containing a combination of RME-DEA surfactant and vegetable oil-DEA surfactant (% by weight) |
|---|---|---|---|
| RME-DEA surfactant | 10-65 | | 5-25 |
| vegetable oil-DEA surfactant | | 10-65 | 5-40 |
| Oleic acid-PEG-200-600 ester co-surfactant | 0-40 | 0-40 | 0-40 |
| cocogem surfactant 1$^x$ | 20-70 | 20-70 | 20-70 |
| Butoxy-ethanol | 0-40 | 0-40 | 0-40 |
| i-buthanol | 0-40 | 0-40 | 0-40 |
| Polyacrylamide | 10-25 | 10-25 | 10-25 |
| Polymer-surfactant composition content of the aqueous displacement solution | 0.2-2.5 | 0.2-2.5 | 0.2-2.5 |
| Optionally other known commercial additives | .0-1.0 | 0-1.0 | 0-1.0 |
| Total additive content of the aqueous solution | 0.3-3.5 | 0.3-3.5 | 0.3-3.5 |

$^x$Cocogem surfactant 1: Bis-4- C$_{10-13}$ 2-sec-benzenesulphonic acid-Jeffamine D400 salt In the following, the invention will be illustrated by means of exemplary embodiments which, however, are not to be construed as limiting the invention.

EXAMPLES

Example 1

Table 4 summarizes the characteristic data of the vegetable base materials of the nonionic surfactants according to the invention and those used for counter-examples [these are the starting materials for the preparation of the surfactant in addition to the diethanolamine (DEA) used in the examples].

The transesterified derivative of a mixture of crude (unrefined) rapeseed oil produced for industrial purposes and A similar difference can be found between the characteristics of the crude (unrefined) industrial rapeseed oil (REOcrude) and the intermediates produced by oxidation of different duration marked as REOcrude ox1 and REOcrude ox2, and industrial refined rapeseed oil (REOrefin). Among them, a significantly higher content of carboxyl groups of the intermediate products obtained by the oxidation of crude (unrefined) oil were found than that of refined rapeseed oil (see higher acid number). The important characteristics of each substance are given in Table 4. For the same type of material, the higher total acid number (TAN) indicates that the starting materials useful in the present invention contain more functional groups capable of polar-polar interactions, typically carboxyl groups, so that the surfactants they produce have better properties (see the tables below).

TABLE 4

Properties of the base materials of the non-ionic surfactants

| Characteristics | TAN (mg KOH/g) | Saponification number (mg KOH/g) | Iodine-bromine number (g I$_2$/100 g) | Kynematic viscosity at 40° C. (mm$^2$/s) |
|---|---|---|---|---|
| RMEcrude + ox | 0.74 | 196.7 | 102.2 | 6.31 |
| RMErefin | 0.29 | 187.0 | 106.2 | 4.75 |
| REOcrude | 0.67 | 183.3 | 100.9 | 41.0 |
| REOcrude ox1 | 1.72 | 163.9 | 99.5 | 57.3 |
| REOcrude ox2 | 3.75 | 184.4 | 96.5 | 123.3 |
| REOrefin | 0.3 | 143.4 | 113 | 43 |
| Test method | ASTM D974 | ISO 3657 | MSZ EN 14111: 2004 | ASTM D445-06 |

In the table

REOcrude ox1: standard (IP 157/ASTM D 7462) under laboratory conditions (170° C., 8 hours, 20 dm$^3$/h, amount of oxidized oil: 20 cm$^3$) oxidized rapeseed oil.

REOcrude ox2: standard (IP 157/ASTM D 7462) under laboratory conditions (170° C., 16 hours, 20 dm$^3$/h, amount of oxidized oil: 20 cm$^3$) oxidized rapeseed oil.

TAN: Total Acid Number

Example 2

Table 5 compares the analytical and efficiency data of surfactants prepared by the reaction of intermediates and diethanolamine according to the above example. Efficiency assessments were carried out using O-1 Algyő mineral oil (characterized in Table 7).

From the measurement data, it was found that the surfactants (T-1, T-5) produced from rapeseed oil methyl-ester (RMEcrude+ox) with increased acid number by admixing used cooking oil; and those produced from the previously oxidized crude rapeseed oil (REOcrude ox1) had higher acid numbers and viscosities than those synthesized from raw materials, which are different from those according to the invention, i.e. from alimentary refined rapeseed oil (REOrefin, T-3) or its methyl-ester (RMErefin, T-2) or crude industrial rapeseed oil (REOcrude, T-4). Thus, in the molecular structure of the starting materials of the invention, there are more free carboxyl groups capable of interacting. In our experience, the minimum emulsifier effect of 80% by volume and 15 mm oil displacement effect required for the efficacy of surfactants were only achieved by the surfactants of the present invention. The IFT interfacial tension data given in the line before the last one of Table 5 were found to be in the range of the normal range of nonionic surfactants, i.e., between 0.30 to 0.41 mN/m. It has also been shown that excessive oxidation (REOcrude ox2, T-6), resulting in an increase in the acid number of vegetable oil to 3.75 mg KOH/g, has a negative effect on the original viscosity of the vegetable oil, above 100 mm$^2$/s. (see Table 4), and also caused turbidity to reduce the solubility of the surfactant in water. Further use of such a higher acid number revealed that such a change in composition and physical properties was already unfavorable, because it made it more difficult to process the higher viscosity oil and even resulted in a reduction in the efficiency of the surfactant end product.

TABLE 5

Efficiency data of nonionic surfactant components according to the compositions of the working examples and counter examples of the invention

| Characteristics | Example T-1 | Counter example T-2 | Counter example T-3 | Counter example T-4 | Example T-5 | Counter example T-6 | Test method |
|---|---|---|---|---|---|---|---|
| Base material | RME crude + ox | RME refin | REO refin | REO crude | REO crude – ox1 * | REO crude ox2** | — |
| Another reagent | DEA | DEA | DEA | DEA | DEA | DEA | — |
| Acid number of the base material | 0.74 | 0.29 | 0.30 | 0.67 | 1.72 | 3.75 | |
| Surfactant characteristics | | | | | | | |
| Water number (cm$^3$ g) (between 10-17 ***) | 12.3 | 10.9 | 10.2 | 9.8 | 14.2 | 15.1 | Method 1 |
| Fire point (° C.) | 174 | 173 | 170 | 171 | 170 | 170 | ISO 3679: 2004 |
| Kynematic visc. at 100° C. (mm$^2$/s) | 15.5 | 17.5 | 35.7 | 37.0 | 39.3 | 44.8 | ASTM D445-06 |
| $d_4^{20}$ (g/cm$^3$) | 0.9827 | 0.9798 | 0.9821 | 0.9847 | 0.9878 | 0.9905 | MSZ EN ISO 12185 |
| Flow point (° C.) | −21 | −21 | −19 | −19 | −19 | −18 | ASTM D2024-09 |

TABLE 5-continued

Efficiency data of nonionic surfactant components according to the compositions of the working examples and counter examples of the invention

| Characteristics | Marking of the nonionic surfactant | | | | | | Test method |
|---|---|---|---|---|---|---|---|
| | Example T-1 | Counter example T-2 | Counter example T-3 | Counter example T-4 | Example T-5 | Counter example T-6 | |
| Total monoester and monoamide content (min. 80% ***) | 88.9 | 92.7 | 78.8 | 77 | 82.3 | 89.7 | Method 2 |
| Total diester and diamide content | 2.1 | 4.9 | 14 | 12 | 11.3 | 9.2 | Method 2 |
| Emulsifying effect 1 hour, 80° C. (V/V %), (min. 80% by volume emulsion phase ***) | 80 | 12 | 5 | 60 | 85 | 70 | Method 3 |
| Oil displacement effect, mm * (min. 15 mm ***) | 29 | 17 | 15 | 9 | 19 | 20 | Method 4 |
| IFT (mN/m), | 0.33 | 0.40 | 0.41 | 0.35 | 0.34 | 0.32 | Method 5 |
| Features after 1 year storage at 100° C. Appearance, cannot be turbid, sedimentary | transparent | opalescent | transparent | transparent | transparent | turbid, sedimentary | Method 6 |

* REOcrude ox1 under laboratory conditions (170° C., 8 hours, 20 dm³/h) oxidized rapeseed oil (according to the method specified in the relevant standard)
**REOcrude ox2 under laboratory conditions (170° C., 16 hours, 20 dm³/h) oxidized rapeseed oil (according to the method specified in the relevant standard).
*** Acceptable value in practice.
Method 5: IFT was determined in a DataPhysics-type spinning-drop device at 1 g/l surfactant concentration and at 40° C.
Method 6: Composition of the model saline solution used to measure the salt tolerance of surfactants: ($MgCl_2*6H_2O$(50 mg/dm³) + $MgSO_4*7H_2O$(50 mg/dm³) + $FeCl_3*6H_2O$(50 mg/dm³) + $FeSO_4*7H_2O$ (50 mg/dm³) + NaCl (50 mg/dm³) + $Ca(OH)_2$ (50 mg/dm³). The total salt content of the aqueous surfactant solution is therefore 300 mg/dm³, and its turbidity is determined by spectrophotometry after 3 h heat treatment at 80° C. The degree of turbidity is the difference expressed in % between the light transmittance of the clear model layer water and the light transmittance of light-impervious turbid water in the 0-100% intensity range at 410 nm.

Example 3

According to the data in Table 6, the physical, chemical and effect properties of the compositions containing individual surfactants and other components used in the weight ratio according to the present invention can be compared with each other. According to the data, the types of surfactants used and the weight ratios used sensitively influenced the emulsifying, interfacial tension decreasing, and oil displacement effects.

TABLE 6

Efficiency data of the polymer surfactant compositions according to the present invention and counter-examples

| Number of composition PT-x | | PT-1 | PT-2 | PT-5 | PT-7 | PT-4 | PT-6 | PT-3 |
|---|---|---|---|---|---|---|---|---|
| Nonionic surfactant | Marking of the components | Concentration (% by weight) | | | | | | |
| | T-1 | 40 | — | 15 | 45 | — | — | — |
| | T-3 | — | — | — | — | — | — | 25 |
| | T-5 | — | — | 25 | — | — | — | — |
| | T-2 | — | 40 | — | — | — | — | — |
| | T-4 | — | — | — | — | 40 | — | — |
| | T-6 | — | — | — | — | — | 40 | — |
| Oleic acid-PEG-300 ester, KOMAD-704 | | — | — | — | 15 | — | — | 20 |
| Cocogem-1 surfactant[6] | | 56 | 36 | 36 | 15 | 36 | 36 | 33 |
| Butoxy-ethanol | | — | 24 | 24 | 25 | 24 | 24 | — |
| 1-butanol | | — | — | — | — | — | — | 22 |
| Surfactant composition content of aqueous solution in % by weight | | 1.5 | 1.0 | 0.7 | 1.2 | 0.5 | 1.8 | 2.2 |
| The polyacrylamide content of the aqueous solution, % by weight, SNF 900 | | 0.1 | 0 | 0.2 | 0.1 | 0.3 | 0.2 | 0.1 |

TABLE 6-continued

Efficiency data of the polymer surfactant compositions according to the present invention and counter-examples

| Number of composition PT-x | PT-1 | PT-2 | PT-5 | PT-7 | PT-4 | PT-6 | PT-3 |
|---|---|---|---|---|---|---|---|
| Other additive (oxygen trap, complexing agent, EDTA), % by weight | 0.001 | 0.001 | 0.001 | 0.001 | 0.001 | 0.001 | 0.001 |
| Physico-chemical properties | | | | | | | |
| $d_4^{20}$ (g/cm$^3$) | 0.9830 | 0.9359 | 0.9963 | 0.9945 | 0.9923 | 0.9953 | 0.9856 |
| Flow point (° C.) | −3.9 | −3.9 | −3.0 | −2.8 | −3.8 | −5.1 | −2.2 |
| Kynematic visc. at 40° C. (mm$^2$/s) | 88.1 | 87.9 | 117.2 | 90.1 | 138.6 | 98.7 | 89.2 |
| Characterization of the effect | | | | | | | |
| Emulsifying effect[1] (% by volume) (min 50% by volume *) | 95 | 80 | 60 | 75 | 39 | 45 | 64 |
| Emulsifying effect under layer gas[2] (% by volume) (min. 5% by volume *) | 5 | 3 | 10 | 10 | 0 | 0 | 0 |
| Oil displacement effect (mm) (min. 20 mm *) | 25 | 12 | 20 | 24 | 18 | 17 | 16 |
| Salt tolerance[3], middle phase, % by volume, 1 hour, 80° C., min. 10% by volume (0-100 *) | 13 | 30 | 16 | 17 | 20 | 18 | 25 |
| Thermal stability[4] at 80° C., T %, min. 20% (0-100 *) | 72 opalescent | 63 opalescent | 20 fenyes | 78 opalescent | 18 bright | 18 bright | 69 opalescent |
| Micellar size, 80° C. (nm) (min. 200 nm *) | 314 | 248 | 272 | 214 | 193 | 209 | 224 |
| Micellar size, 130° C. (nm) | 1316 | 782 | 2530 | 3400 | 4605 | 2305 | 1710 |
| Dynamic viscosity of a 1:1 ration mixture of mineral oil/layer water at 80° C. (mPas) (max. 100 mPas *) | 12 | 15 | 13 | 30 | 35 | 32 | 18 |
| IFT[5] (mN/m) (max 0.05 mN/m *) | 0.042 | 0.06 | 0.0023 | 0.022 | 0.670 | 0.590 | 0.053 |
| Characteristics of the polymer surfactant solution after 1 year storage at 100° C.: Appearance: cannot be turbid, sedimentary | transparent | opalescent | transparent | transparent | transparent | turbid, sedimentary | transparent |

IFT was determined in a DataPhysics-type spinning-drop device at 1 g/l surfactant concentration and at 40° C.
PT-x: Polymer surfactant compositions of the invention and counter-examples
x[1]Emulsifying effect at atmospheric pressure at 90° C.
x[2]Emulsifying effect at 10 bar layer gas pressure, 90° C.,
x[3]test data for the emulsification effect with increased salt content layer water
x[4]transmittance of the aqueous solution of the PT composition (100-T %) after heat treatment (80° C.)
x[5]interfacial tension between 0.5% aqueous solution of PT composition and Algyő mineral oil (mN/m)
x[6]Cocogem surfactant 1: Bis-4- $C_{10-13}$ 2-sec-benzenesulfonic acid-Jeffamine D400 salt
* Practically acceptable value.

Thus, the surfactant compositions (PT-1, PT-5 and PT-7) produced by the preferred component ratios according to the invention proved to have a balanced high emulsifying, oil displacement, and high IFT decreasing effect (IFT=10$^{-3}$-10$^{-2}$ mN/m). However, important features from the point of view of the chemical tertiary oil extraction technology (CEOR) were significantly below the particular limits of laboratory selection (in the case of PT-2, PT-3, PT-4, PT-6 counterparts) if they considering their composition, the types of their components or their weight ratios fell outside the ranges of the specified quality limits of the polymeric surfactant compositions of the invention. It should be noted that based on the effect characteristics of the composition PT-2, it can be concluded that a combination without the polymer, but containing the surfactant composition of the present invention, was able to achieve a significantly lower oil displacement effect.

Example 4

According to our experience of the practical use, the polymer-surfactant compositions of the present invention have the essential feature that the surfactant combinations used at the preparation with the polyacrylamide-type flow modifying polymers, as a result of their association with aqueous solution, form a homogeneous size distribution, and a mixed micellar structure of much larger average size than the average hydrodynamic size of the components. Based on the favorable displacement results achieved, it is assumed that these micelles having internal structure formed from the apolar groups of amphiphilic molecular structure surfactant components stable even at temperatures above 100° C. are capable of incorporating a higher proportion of crude oil into their internal structure and thereby mobilizing from the pores of the reservoir than the conventionally used surfactant compositions with smaller micelle size.

With the data in Table 7, we wanted to illustrate that the viscosity-increasing synergistic interaction between the composition of the invention and the commercial polyacrylamides with various hydration level (Flopaam AN sulphonated and partially hydrated polymer products of SNF Floerger produced by SNF Floerger) used as flow modifiers, has also formed. Selection of the most suitable type for practical use can be considered a routine task, however, it is advisable to consider the parameters of the application area such as the composition of the layer water, the temperature of the reservoir, the composition of the oil and the physical and chemical properties of the reservoir rock. According to the data in Table 7, the dynamic viscosity of the aqueous solutions containing the surfactant composition and the particular type of flow modifying polyacrylamide polymer was about 10-15% higher than the simple additionally of the viscosity increases caused by the individual components. This viscosity increment, which is very advantageous in terms of application, is the result of a micelle size increasing interaction between the components of the polymer-surfactant composition. According to the data of the efficiency studies, only a small excess of oil yield could be achieved with an aqueous solution of the polymer-free surfactant, or with an aqueous solution of the surfactant-free polymer, which likewise suggests the previously suggested mechanism of action of the polymer-surfactant composition of the present invention.

TABLE 7

Examination of various polymers, polymer surfactant solutions (total salt content of real layer water, Total Dissolved Solids (TDS = 3.8 g/dm$^3$), polymer concentration: 1000 ppm, surfactant composition concentration 1.5 g/dm$^3$)

|  | Mark A commercial polyacrylamide | Mark B commercial polyacrylamide | Mark C commercial polyacrylamide | Without polymer | Surfactant composition according to Example PT-1 | | |
|---|---|---|---|---|---|---|---|
|  |  |  |  |  | Mark A commercial polyacrylamide | Mark B commercial polyacrylamide | Mark C commercial polyacrylamide |
| Molecular weight, Da | 8M | 8M | 14-16M | — | — | — | — |
| Level of sulphonalization, % | 25 | 25 | n.a. | — | — | — | — |
| Level of hydration, % | 25 | n.a. | 15 | — | — | — | — |
| $d_4^{20}$ (g/cm$^3$) | 0.9540 | 0.9670 | 0.9411 | 0.9340 | 0.9580 | 0.9830 | 0.9640 |
| Oil displacement effect (mm) (min. 20*) | 17 | 15 | 14 | 16 | 30 | 30 | 36 |
| IFT (mN/m) (max. 0.05*) | 10 | 12 | 12 | 0.039 | 0.042 | 0.05 | 0.06 |
| $DV_{25°C}$ (mPas)■ | (12) | (12) | (16) | (2) | 16 | 17 | 20 |
| $ADV_{25°C}$ (mPas)■■ | — | — | — | — | (2) | (3) | (2) |
| Excess oil yield. % | 3 | — | — | 4 | 29.2 | 11.87 | 26.6 |

■The dynamic viscosity at 25° C. of the solutions containing only the surfactant and the solutions containing only the flow modifier are shown in parentheses
■■(Synergistic) increase in viscosity due to the interaction of the surfactant composition and the polymer
*Practically acceptable value.
The trade name of Mark A poliacrylamide used is Floopam AN125 SH (manufactured by SNF Floerger)
The trade name of Mark B poliacrylamide used is Floopam AN125 (manufactured by SNF Floerger)
The trade name of Mark C poliacrylamide used is Floopam 5115 (manufactured by SNF Floerger)

Example 5

TABLE 8

Characteristics of various mieral oils (O-1, O-2, O-3), and data for the EOR laboratory impact assessments with three polymer-surfactant compositions (polymer content 0.1% by weight) according to the present invention

| Characteristic | Marking of the mineral oils | | | Test method |
|---|---|---|---|---|
|  | O-1 | O-2 | O-3 |  |
| Characteristics of the mineral oils |  |  |  |  |
| $d_4^{20}$ (g/cm$^3$) | 0.8359 | 0.8797 | 0.897 | MSZ EN ISO 12185 |
| Starting boiling point (° C.) | 117.8 | 89.2 | 99 | MSZ EN ISO 3405: 2011 |

TABLE 8-continued

Characteristics of various mieral oils (O-1, O-2, O-3), and data for the EOR laboratory impact assessments with three polymer-surfactant compositions (polymer content 0.1% by weight) according to the present invention

| | Marking of the mineral oils | | | |
|---|---|---|---|---|
| Characteristic | O-1 | O-2 | O-3 | Test method |
| boiling point at 50% (° C.) | 264.6 | 270.2 | 371 | MSZ EN ISO 3405: 2011 |
| Boiling distillate up to 350° C. (% by volume) | 44 | 44 | 46 | MSZ EN ISO 3405: 2011 |
| $K_w$, Watson characterizing factor | 12.8 | 12.9 | 10.3 | |

| | Efficiency studies | | | |
|---|---|---|---|---|
| Marking of the surfactant composition: | PT-1 | PT-5 | PT-7 | |
| Emulsifying effect, 1 hour, 80° C. (V/V %); min. 50% | 90 | 77 | 55 | method 3 |
| Oil displacement effect (mm); min. 20 mm | 29 | 22 | 26 | method 4 |
| Salt tolerance potential, middle phase (% by volume), 1 hour, 80° C.; min. 10% by volume | 60 | 22 | 20 | method 6 |

The data in Table 8 confirm that the Mark PT-1, PT-5, and PT-7 compositions of the present invention are suitable for the recovery of a broad range of compositions of mineral oil types.

However, for the different types of mineral oils, the optimal composition of the effective polymer-surfactant composition within the ranges of the component ratios of the invention had to be selected by selection based on laboratory impact assessments.

Example 6

Table 9 shows the compositions for further polymer-surfactant compositions of the present invention, furthermore, for embodiments of compositions with different compositions from that of the present invention selected based on the tests of the enhanced oil displacement laboratory model, containing other commercial surfactants.

TABLE 9

Composition of examples and counter examples of compositions according to the invention

| Mark of the composition | Examples according to the invention | | | | Counter examples | | | | | |
|---|---|---|---|---|---|---|---|---|---|---|
| | K-1 | K-2 | K-3 | K-4 | K-5 | K-6 | K-7 | K-8 | K-9 | K-10 |
| Surfactant components % by weight RME-DEA (T-1, 2. example) | 40 | — | 25 | — | 5 | 65 | 20 | — | | |
| Vegetable oil mixture-DEA (T-5, 2. example) | — | 36 | — | 25 | 5 | — | — | — | | |
| Commercial Elain-PEG-300 ester | — | — | 20 | 19 | 12 | — | 20 | 20 | | |
| Cocogem surfactant 1 | 36 | 63 | — | 33 | — | — | — | — | | |
| Cocogem surfactant 2 | — | — | 32 | — | 67 | — | — | 50 | 70 | |
| Butoxy-ethanol | 24 | — | 23 | 23 | 11 | 20 | — | 20 | 20 | 20 |
| Other commercial surfactant content, % by weight | — | — | — | — | — | 15 | 60 | 10 | 10 | 80 |
| Total surfactant content of aqueous solution, % by weight | 1.5 | 1.5 | 1.5 | 1.5 | 1.5 | 1.5 | 1.5 | 1.5 | 1.5 | 1.5 |

TABLE 9-continued

Composition of examples and counter examples of compositions according to the invention

| Mark of the composition | Examples according to the invention | | | | Counter examples | | | | | |
|---|---|---|---|---|---|---|---|---|---|---|
|  | K-1 | K-2 | K-3 | K-4 | K-5 | K-6 | K-7 | K-8 | K-9 | K-10 |
| The poliacrylamide content of the aqueous solution, ppm | 1000 | 1000 | 1000 | 1000 | 1000 | 1000 | — | 1000 | — | 1000 |
| Total additive in the aqueous solution, % by weight | 1.6 | 1.6 | 1.6 | 1.6 | 1.6 | 1.6 | 1.5 | 1.6 | 1.5 | 1.6 |

In the table:
Cocogem surfactant 1: Bis-4- $C_{10-13}$ 2-sec-benzenesulphonic acid-Jeffamine D400 salt.
Cocogem surfactant 2: Bis-alpha-olerefin sulphonic acid N,N'-Jeffamine-D230 salt.

Example 7

Table 10 contains the data of the efficiency studies for the compositions according to the examples in Table 9. Based on this data, it can be clearly demonstrated that the polymer-surfactant compositions of the present invention exhibit excellent emulsifying properties at 80° C., i.e., at approximately the temperature of the storage layer, as well as they reduce the surfacial tension to between $10^{-3}$-$10^{-2}$ mN/m, furthermore, they have a significant oil displacement effect, as well as their salt tolerance is much greater than that of the commercial reference compositions and surfactant compositions other than those of the present invention. In addition, the surfactant compositions of the present invention have been found to be particularly stable in the reference samples during a 12-month high-temperature heat treatment at 100° C., which is a basic quality requirement for multi-year infiltration operations of high temperature layers.

TABLE 10

Use properties of the polymer surfactant compositions of the present invention and those of the counter-examples

| Characteristics | Examples of the invention | | | | Counterexamples | | | | | |
|---|---|---|---|---|---|---|---|---|---|---|
|  | K-1 | K-2 | K-3 | K-4 | K-5 | K-6 | K-7 | K-8 | K-9 | K-10 |
| Emulsifying effect at 25° C., middle phase % by volume | 99 | 90 | 75 | 65 | 90 | 95 | 97.5 | 92.5 | 40 | 90 |
| Emulsifying effect at 80° C., volume of the middle phase, after 1 hour settling, % by volume | 95 | 100 | 95 | 95 | 82.5 | 80 | 85 | 82.5 | 5 | 82.5 |
| Oil displacement effect at 80° C., mm | 25 | 20 | 22 | 24 | 8.5 | 7.5 | 6.0 | 8.0 | 6.0 | 8.5 |
| Excess oil recovery on storage rock sample, % by weight | 45.1 | 39.4 | 33.0 | 30.3 | 3.0 | 1.5 | 10.2 | 10.0 | 2.0 | 12.5 |
| Salt tolerance, TDS = 300 mg/dm³ (turbidity in water), % | 6 | 5 | 8 | 8 | 21 | 27 | 25 | 29 | — | 21 |
| Salt content of layer water*, (TDS, g/dm³) | 5 | 15 | 30 | 250 | 5 | 15 | 30 | — | — | — |
| Turbidity belonging to the TDS values specified in above line (0-100%) | 7 | 9 | 12 | 16 | 34 | 43 | 67 | — | — | — |
| Oil/water surfacial tension, 1% solution mN/m | 0.012 | 0.022 | 0.023 | 0.003 | 0.900 | 0.620 | 0.089 | 0.045 | 0.1 | 0.104 |
| Measurement of thermal stability, after heat treatment at 100° C., based on excess oil displacement measured on storage rock sample, % by weight | | | | | | | | | | |
| Duration of heat treatment 0 day | 6.7 | 12.5 | 26.3 | 28.3 | 28 | 3.1 | 4.3 | 3.2 | — | — |

TABLE 10-continued

Use properties of the polymer surfactant compositions of the present invention and those of the counter-examples

| | Examples of the invention | | | | Counterexamples | | | | | |
|---|---|---|---|---|---|---|---|---|---|---|
| Characteristics | K-1 | K-2 | K-3 | K-4 | K-5 | K-6 | K-7 | K-8 | K-9 | K-10 |
| 3 months | 16.8 | 13.5 | 15.4 | 33.1 | 27 | 4.3 | 3.1 | 4.3 | — | — |
| 6 months | 19.4 | 20.3 | 16.7 | 30.9 | 12 | 2.3 | 2.9 | 2.4 | — | — |
| 12 months | 20.8 | 17.5 | 18.3 | 30.6 | 4.5 | 3.5 | 2.3 | 3.6 | — | — |
| Average micelle size in case of 15 g/dm$^3$ additive content, after 72 hours of storage, nm | | | | | | | | | | |
| 60° C. | 54 | 110 | 80 | 105 | 45 | 95 | 57 | 63 | — | — |
| 80° C. | 210 | 167 | 98 | 112 | 103 | 121 | 106 | 94 | — | — |
| 100° C. | 260 | 230 | 407 | 320 | 93 | 172 | 170 | 125 | — | — |
| 120° C. | 305 | 244 | 605 | 455 | 60 | 144 | 200 | 189 | — | — |
| Dynamic viscosity of the emulsion of a layer water solution containing 50% by volume, 1.5% surfactant composition és 50% by volume of Algyő mineral oil at 80° C., mPas | 13.5 | 15.6 | 21.8 | 12.5 | 32.8 | 26.1 | 45.0 | 35.5 | — | 32.8 |

*For the purpose of the efficiency studies, the surfactant compositions were dissolved in various salt-containing layer waters.

The data of Table 10 demonstrates the high emulsifying, IFT reducing and oil displacement properties, adequate thermal stability and satisfactory solubility in high salt containing layers of the polymer-surfactant compositions of the present invention.

Figure 1:
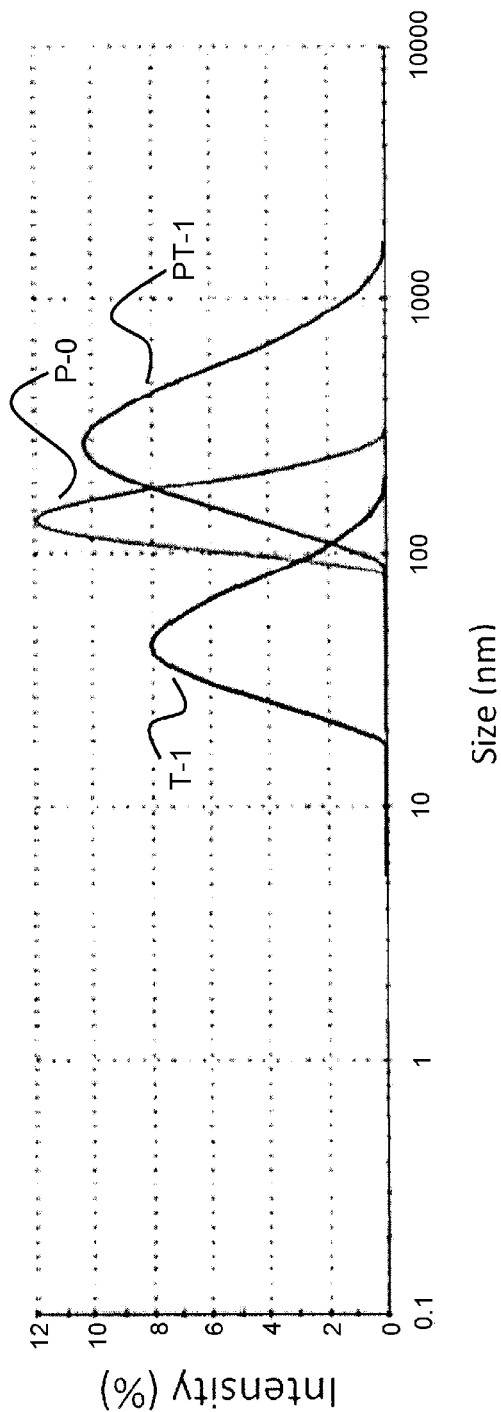
FIG. 1: Particle size distribution of the composition and main components of the polymer-surfactant compositions PT 1 according to the invention dissolved in Algyő layer water at 80° C. In the figure, P-0 is a clear polymer solution and T-1 is a polymer-free surfactant solution.

Based on the examples presented in Tables 6 to 10, we found that between the selected flow-modifying polyacrylamide and nonionic and anionic cocogem surfactants, supposedly due to the polar-polar interaction between their increased number of functional groups, the properties of the colloidal fluid have changed to an unusual extent. Based on our features, we have determined the following:

a) The dynamic viscosity of an aqueous solution containing the polymer and surfactants increased by more than 10-15% compared to the additive viscosity enhancing effect of individual components.

b) By increasing the temperature of the solution above 80° C., instead of the medium-sized micelles of the polymer and surfactant components, an aqueous colloidal solution containing mixed micelles of a uniform structure and uniform size distribution having an increased average micelle size was formed. In addition, the aqueous solutions were fully cleared in parallel with the increase in nano-range micellar sizes, i.e., poorly soluble and disintegrating nonionic surfactants at temperatures above 80° C. were incorporated into a growing water-soluble mixed micelle (FIG. 1). FIG. 1 is a side-by-side analysis of the nano-range, molecular size distribution curve of the polyacrylamide (P-0) dissolved in the layer water and the surfactant composition (T-1) measured separately, and the distribution curve of solutions containing the polymer and the surfactant composition together (PT-1 and PT-5). Comparing these, it was clearly found that in this multicomponent system, due to the molecular interactions, the solution structure change occurred in such a way that after the dissolution of the components, the smaller nano-sized surfactant molecules and the larger polymer molecules disappeared from the solution, because a micelle structure having a molecular size of approximately one magnitude larger than all of the components was formed, which is uniform, i.e. having monomodal distribution curve, and is well soluble. The exceptional feature of this micellar structure is that the solution did not break down during the temperature increase, but further increased in the range of application temperature of 60-140° C. In addition to the structural stability of the polymer-surfactant solution, the emulsifying and oil displacement effects were not reduced.

c) By increasing the temperature above 100° C., the smaller microassociations formed by the heat from the polymer and surfactant molecules were reconnected, resulting in a further increase in their micelle size and in the viscosity of the solution (FIG. 2).

d) Large micelles, which are sized above 1000 nm on average, have been stable during 10 days of heat treatment at 135-140° C., and their solutions remain bright and clean. It is assumed that the increase in the number of carboxyl groups formed by oxidation due to oxidation on the apolar chains of surfactant molecules increased the potential for intra- and intermolecular interactions. The increasing interactions made it possible to develop a micellar structure with a boundary layer, which is stronger, and is more resistant to the spontaneous hydrolysis of surfactants from the aqueous phase, and to the solubility-reducing effect of the high salt content.

e) According to our measurements, large micelles are capable of keeping even 50 v/v % of mineral oil in a low viscosity O/V type emulsion (less than 22 mPas), which is advantageous in terms of oil recovery.

Preparation of the Polymer Solution According to the Invention

In the preparation of the composition, the following steps were taken: a) dissolving the polyacrylamide in the recovered layer water; b) admixing the vegetable fatty acid methyl-ester based surfactant, the co-surfactant, and as anionic cocogem surfactant the bis(4-(2-alkyl)benzene-sulphonate)-poly(propylene-glycol)-bis(2-ammonium-propyl)-ether salt using the following operating parameter ranges: i) temperature range: 30-80° C.; ii) pressure range: 0.9-1.2 bar; iii) residence time range: 12-36 hours.

Synergism

With the above experimental support we have shown that
a) the polymer-surfactant composition comprising anionic cocogem surfactant and nonionic surfactant in combination with polyacrylamide according to the invention is more tolerant of the more adverse environmental effects of enhanced oil recovery processes, in particular the high temperature and salt content of the recovery depth are better tolerated than in the case with the individual properties of the components; and has a much better thermal stability than the prior art;
b) the polymer-surfactant composition comprising anionic cocogem surfactant and nonionic surfactant in combination with polyacrylamide according to the invention has a higher viscosity increasing and oil displacement effect and an additional oil yield potential compared to the prior art.

The above advantageous properties are due to the simultaneous use of the components, in the absence of these, the technical advantages would not be available. Therefore, it can be stated that the composition according to the invention is based on unexpected synergistic interactions of the components.

INDUSTRIAL APPLICABILITY

The present invention provides a polymer surfactant that comprises one or more cocogem surfactants, one or more nonionic vegetable fatty acid (or synthetic analogues) based surfactants, water soluble polymers, preferably polyacrylamide polymers, optionally one or more phase transfer agents, preferably alcohol, and optionally one or more commercially available co-surfactants, and through which an enhanced (25±5 vol. %) excess oil displacement can be achieved in enhanced oil recovery processes. Furthermore, the polymer surfactant composition of the present invention also has a degree of thermal stability and a salt tolerance that enables CEOR oil recovery from reservoirs above 100° C. in deeper layers.

What is claimed is:

1. A highly stable micelle-structured polymer-surfactant composition for an enhanced oil extraction process, said composition comprises the following ingredients:
a) one or more anionic cocogem surfactants selected from the following compounds of formula (I):

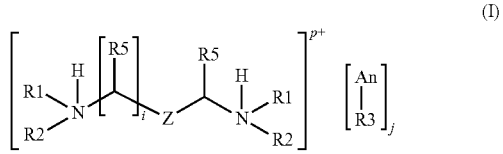

wherein in the formula
each R1 and R2 is independently selected from hydrogen; or straight or branched chain alkyl having 1 to 18 carbon atoms, optionally substituted with hydroxy;
each R3 is independently selected from hydrogen; a straight or branched chain alkyl or alkenyl group having from 1 to 25 carbon atoms, optionally containing an inter-chain amido group; an aromatic group optionally substituted with a straight or branched chain alkyl having 1 to 25 carbon atoms; or a straight or branched chain alkenyl, alkadienyl or alkatrienyl group having 10 to 20 carbon atoms;
Z is a straight or branched chain alkylene group having 1 to 18 carbon atoms, optionally substituted with one or two alkyl having 1 to 6 carbon atoms or with cycloalkyl having 3 to 6 carbon atoms, which alkylene group optionally contains $(EO)_n$ and/or $(PO)_m$ groups, where EO is ethylene oxide, i.e. —$CH_2CH_2O$—, and PO is propylene oxide, i.e. —$CH(CH_3)CH_2O$—, wherein n and m are independently integers from 0 to 30 and n+m is an integer from 1 to 30; or $[NH(R4)]^+$ quaternary ammonium, wherein R4 is hydrogen or alkyl having 1 to 6 carbon atoms;
R5 is hydrogen or alkyl having 1 to 6 carbon atoms;
An is selected from one or more groups selected from the group consisting of $SO_3^-$, $Cl^-$ or $CO_2^-$;
i is an integer of 0 or 1;
p is an integer of 2 or 3;
j is an integer of 2 or 3;
b) one or more nonionic surfactants which are a reaction product of an alkanolamine having 2 to 12 carbon atoms and one or more glyceride-type oxidized oils and/or one or more oxidized fatty acid-(C1-05-alkyl)-esters wherein the glyceride-type oxidized oil has an acid number of 0.7-3.0 mg KOH/g; the acid number of the oxidized fatty acid-(C1-05)-alkyl ester is 0.3-0.9 mg KOH/g;
c) optionally one or more co-surfactants;
d) optionally one or more materials having phase transfer properties;
e) as a flow modifier polyacrylamide having an average molecular weight between 100,000 and 20,000,000 and a hydrodynamic molecular size between 100 and 50,000 nm;
said composition may optionally contain other known commercial additives, as well as the composition may also contain another stabilizing agent having the effect of increasing the solubility of the various additives in water or oil.

2. The highly stable micelle-structured polymer surfactant composition according to claim 1, wherein in the formula (I) of the anionic cocogem surfactant each of R1 and R2 is independently selected from hydrogen; or straight or branched alkyl having 1 to 8 carbon atoms, or straight chain hydroxy substituted alkyl having 1 to 3 carbon atoms.

3. The highly stable micelle-structured polymer surfactant composition according to claim 1, wherein in the formula (I) of the anionic cocogem surfactant each of R1 and R2 is hydrogen or alkyl having 1 to 4 carbon atoms;
Z is a straight or branched chain alkylene having 1 to 6 carbon atoms;
p and j are both 2 or 3;
R3 is phenyl substituted with straight or branched chain alkyl having 7 to 10 carbon atoms.

4. The highly stable micelle-structured polymer surfactant composition according to claim 1, wherein in the formula (I) of the anionic cocogem surfactant each of R1 and R2 is hydrogen;
i is 0;
R5 is methyl;
p and j are both 2;
R3 is selected from the group consisting of straight or branched chain alkyl or alkenyl having 1 to 18 carbon atoms;

Z is a straight or branched alkylene group having 1 to 10 carbon atoms, containing $(PO)_m$ groups wherein PO is a propylene oxide group, i.e. —$CH(CH_3)CH_2O$—, and m is an integer from 1 to 5.

5. The highly stable micelle-structured polymer surfactant composition according to claim 1, wherein in the formula (I) of the anionic cocogem surfactant each of R1 and R2 is hydrogen or alkyl having 1 to 4 carbon atoms;
Z is a straight or branched alkylene group having from 1 to 7;
p and j are both 2 or 3;
R3 is selected from the group consisting of straight or branched chain alkyl or alkenyl having 1 to 18 carbon atoms; preferably a branched chain alkyl or alkenyl group having from 1 to 18 carbon atoms;
i is 1; and
R5 is hydrogen.

6. The highly stable micelle-structured polymer surfactant composition according to claim 1, wherein in the formula (I) of the anionic cocogem surfactant R1 and R2 is independently selected from hydrogen; methyl or straight-chain alkyl having 1 to 3 carbon atoms substituted with hydroxy.

7. The highly stable micelle-structured polymer surfactant composition according to claim 1, wherein in the formula (I) of the anionic cocogem surfactant Z is a straight or branched chain alkylene having from 1 to 6 carbon atoms;
p and j are both 2 or 3;
R3 is phenyl substituted with straight or branched chain alkyl having 7 to 10 carbon atoms.

8. The highly stable micelle-structured polymer surfactant composition according to claim 1, wherein in the formula (I) of the anionic cocogem surfactant R1 and R2 is hydrogen;
i is 0;
R5 is methyl;
p and j are both 2;
R3 is branched chain alkyl having 14 to 17 carbon atoms or secondary alkyl having 14 to 17 carbon atoms or alkenyl having 14 to 17 carbon atoms; and
Z is a branched alkylene group having 1 to 7 carbon atoms containing $(PO)_m$ groups and m is an integer of 2-3.

9. The highly stable micelle-structured polymer surfactant composition according to claim 1, wherein in the formula (I) of the anionic cocogem surfactant R1 and R2 are hydrogen or methyl;
Z is a straight or branched chain alkylene having from 1 to 4 carbon atoms;
p and j are both 2 or 3;
R3 is secondary alkyl having 14 to 17 carbon atoms;
i is 1; and
R5 is hydrogen.

10. The polymer-surfactant composition according to claim 1, wherein the nonionic surfactant is a reaction product of the reaction of one or more oxidized vegetable oils, or a synthetic analogue thereof, and/or one or more oxidized vegetable fatty acid-(C1-C5)-alkyl-esters, or a synthetic analogue thereof, and a alkanolamine having 2 to 12 carbon atoms.

11. The polymer-surfactant composition of claim 10, wherein the nonionic surfactant based on one or more vegetable oils or the synthetic analogues thereof and/or the vegetable fatty acid methyl ester or synthetic analogues thereof has the following composition:
at least 70% by weight of fatty acid monoester (3) and fatty acid amide (4);
up to 20% by weight of other reaction products;
up to 25% by weight, preferably up to 15% by weight of unreacted starting material and catalyst by-product and other by-products.

12. The polymer-surfactant composition according to claim 1, wherein the co-surfactant is a reaction product of a fatty acid having 16 to 20 carbon atoms and polyethylene glycol having an average molecular weight of 200 to 600.

13. The polymer-surfactant composition according to claim 1, comprising
a) 10-70% by weight of cocogem surfactant;
b) 10 to 65% by weight of vegetable oil methyl ester-diethanolamine surfactant or vegetable oil-diethanolamine surfactant or combination of 5-25% by weight of vegetable oil methyl-ester-diethanolamine surfactant and 5-40% by weight of vegetable oil-diethanolamine surfactant, where the vegetable oil is rapeseed oil and/or sunflower oil;
c) optionally from 10 to 40% by weight of a co-surfactant, which is a fatty acid or a fatty acid mixture, or a reaction product of a triglyceride of fatty acids and a polyalkylene glycol having an average molecular weight of 200 to 600;
d) 0-40% by weight of butoxyethanol or i-butanol;
e) 10-25% by weight of polyacrylamide.

14. The polymer-surfactant composition according to claim 1, wherein the flow modifier polyacrylamide has a hydrodynamic molecular size between 100 and 10,000 nm.

15. The polymer-surfactant composition according to claim 3, wherein each of R1 and R2 is methyl; and Z is a straight or branched chain alkylene having 1 to 4 carbon atoms.

16. The polymer-surfactant composition according to claim 5, wherein
R3 is a branched chain alkyl from 14 to 17 carbon atoms, or a secondary alkyl having from 14 to 17 carbon atoms, or alkenyl having from 14 to 17 carbon atoms.

17. A process for the preparation of a polymer-surfactant composition according to claim 1, comprising mixing of a nonionic surfactant based on one or more oxidized vegetable oils or a synthetic analogue thereof and/or an oxidized vegetable fatty acid alkyl-ester or a synthetic analogue thereof with an anionic cocogem surfactant and as a flow modifying agent with polyacrylamide, optionally with a co-surfactant; optionally with a phase transfer material, in any order, and homogenizing of the product.

18. The process according to claim 17, wherein the oxidized vegetable oil or a synthetic analogue thereof is prepared by heating a vegetable oil or a synthetic analogue thereof in the presence of oxygen, and the oxidized vegetable fatty acid alkyl-ester or a synthetic analogue thereof is prepared by transesterification of the oxidized vegetable oil or its synthetic analogue obtained by oxidation.

19. A method for improving the efficiency of an oil recovery process, wherein before or during the start of oil recovery
a) a polymeric surfactant composition according to claim 1 is introduced to the oil-containing layer; or
b) first a surfactant composition produced from the a) and b) components of the polymer-surfactant composition according to claim 1, optionally together with component c), with the admixed component d), followed by the polyacrylamide component according to point e) are introduced to the oil-containing layer.

20. The method according to claim 19, wherein the surfactant composition is in the form of an aqueous solution of 0.3 to 3.0% by weight.

* * * * *